United States Patent
Hayashima et al.

(10) Patent No.: US 9,970,403 B2
(45) Date of Patent: May 15, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Naoki Hayashima, Susono (JP); Mitsuhiro Tabata, Sunto-gun (JP); Koji Murakami, Susono (JP); Tomoya Takahashi, Ebina (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/683,099

(22) Filed: Aug. 22, 2017

(65) Prior Publication Data

US 2018/0058407 A1 Mar. 1, 2018

(30) Foreign Application Priority Data

Aug. 31, 2016 (JP) ................................. 2016-169212

(51) Int. Cl.
| | |
|---|---|
| *F01L 1/34* | (2006.01) |
| *F02N 11/08* | (2006.01) |
| *F02N 19/00* | (2010.01) |
| *F02D 13/02* | (2006.01) |

(52) U.S. Cl.
CPC ...... *F02N 11/0818* (2013.01); *F02D 13/0234* (2013.01); *F02N 19/005* (2013.01); *F02N 2019/007* (2013.01)

(58) Field of Classification Search
CPC ............. F01N 11/0818; F02D 13/0234; F02N 19/005; F02N 2019/007
See application file for complete search history.

(56) References Cited

U.S. PATENT DOCUMENTS

| | | | |
|---|---|---|---|
| 8,000,885 B2 * | 8/2011 | Nakai | F02D 41/042 123/179.4 |
| 2004/0060530 A1 | 4/2004 | Mitani et al. | |

FOREIGN PATENT DOCUMENTS

| | | |
|---|---|---|
| EP | 1 403 511 A1 | 3/2004 |
| JP | 2004-124753 | 4/2004 |
| JP | 2004-176709 | 6/2004 |
| JP | 2014-218970 | 11/2014 |
| JP | 2015-48827 | 3/2015 |

* cited by examiner

*Primary Examiner* — Zelalem Eshete
(74) *Attorney, Agent, or Firm* — Finnegan, Henderson, Farabow, Garrett & Dunner, LLP

(57) ABSTRACT

When a start condition is satisfied after the internal combustion engine has been stopped according to an automatic stop control, a control apparatus reversely rotates the engine to compress an air in an expansion stroke cylinder at that time point, and thereafter generates a first time combustion. The apparatus determines whether the start condition becomes satisfied based on a first start request owing to a driving operation by a driver of a vehicle on which the engine is mounted. When the start condition becomes satisfied based on the first start request, the control apparatus makes a maximum value of an engine generating torque by the first time combustion and/or a maximum torque of the engine generating torque by a second time combustion larger as compared to when the start condition becomes satisfied based on a second start request other than the first start request.

6 Claims, 12 Drawing Sheets

CONTROL APPARATUS FOR INTERNAL COMBUSTION ENGINE

BACKGROUND OF THE INVENTION

1. Field of the Invention

The present invention relates to a control apparatus having a function to automatically stop and start a multi cylinder internal combustion engine (hereinafter, simply referred to as an "engine").

2. Description of the Related Art

There has been conventionally known a control apparatus which performs an automatic engine stop control for automatically stopping an operation (rotation) of an engine when a predetermined automatic stop condition is satisfied, in order to improve a fuel efficiency of a vehicle on which the engine is mounted and reduce an amount of exhaust gas emitted from the vehicle.

One of the conventional apparatuses reversely rotates a crankshaft using a motor when a start condition for starting the engine which has been automatically stopped is satisfied, and injects a fuel into a cylinder which is in an expansion (combustion) stroke at that point in time so as to generate a combustion in that cylinder. A torque generated by that combustion forwardly rotates the crankshaft to start the engine (e.g., refer to Japanese Laid Open Patent Application No. 2004-176709). Note that a torque generated by a combustion is, hereinafter, sometimes referred to as an "engine generating torque."

SUMMARY OF THE INVENTION

In view of a requirement to shorten a time (hereinafter, referred to as a "start response time") from a point in time at which an engine rotational speed is zero (i.e., the engine is in the stopped state according to the automatic stop control) to a point in time at which the engine rotational speed reaches a start completion rotational speed which is roughly equal to an engine rotational speed when the engine is in an idling state, it is preferable that the engine generating torque generated when a combustion occurs in each of the cylinders during a starting period be large.

However, the engine rotational speed at a point in time (this point in time is also referred to as an "engine start point in time") immediately after the crankshaft starts to rotate by the first combustion after the start condition was satisfied is lower than the engine rotational speed when the engine is in the idling state. Further, generally, a character frequency of the engine is set at a value lower than a frequency which is determined based on an interval of combustions when the engine is in the idling state. Accordingly, since the engine rotational speed immediately after the engine start point in time is within a speed range which may cause the engine to resonate (hereinafter, the range is referred to as a "character frequency range"), the engine may resonate (vibrate sympathetically) due to the engine generating torque which is repeatedly generated so that a vibration of the engine may be amplified at and immediately after the engine start point in time. As a result, the vibration of the engine may become large/harsh.

Meanwhile, there are two kinds of requirements/requests for starting the engine which satisfy the start condition. Namely, one of the requests for starting the engine is a "start-request caused by a driving operation of a driver based on a driver's intention to start running/traveling the vehicle." The other of the requests for starting the engine is a "start-request which is not caused by the driving operation of the driver based on the driver's intention to start running/traveling the vehicle (e.g., a requirement to start the engine in order to charge a battery on the vehicle)." When the "start-request caused by the driving operation of the driver" is generated, it is necessary to quickly start the engine, and thus, it is required to shorten the start response time rather than suppressing the vibration of the engine at and immediately after the engine start point in time. In contrast, when the "start-request which is other than the request caused by the driving operation of the driver" is generated, the "generated vibration" is easy to have the driver feel uncomfortable, since the engine is started regardless of the driver's intention. Therefore, it is required to suppress the vibration of the engine at and immediately after the engine start point in time rather than shortening the start response time.

The present invention is made in view of the requirements described above. Namely, the object of the present invention is to provide a control apparatus for an internal combustion engine, which can satisfy the requirements for reducing a possibility that the driver feel uncomfortable about the vibration of the engine and for shortening the start response time, by changing a maximum value of the engine generating torque in accordance with the kind of the request for starting the engine, the engine generating torque being generated by the combustion in the period in which the engine rotational speed is likely to be within the character frequency range.

A control apparatus (hereinafter, also referred to as a "present invention apparatus") for an internal combustion engine according to the present invention is applied to a multi-cylinder internal combustion engine which comprises a motor (26) which rotates (drives) the crankshaft 24. The internal combustion engine has a piston (22) provided to be able to reciprocate, a fuel injector (39) which injects a fuel directly into a combustion chamber (25), and an ignition device (35) which generates a spark for ignition in the combustion chamber (25), for/in each of cylinders.

The present invention apparatus comprises:

condition satisfaction determination means (84, S101, S104, S501, S505) for determining whether or not a predetermined start condition becomes satisfied after the internal combustion engine is in a stopped state according to an automatic stop control;

start control means (84, S206 to S215, S406 to S415, S512 to S517, and S521 to S524) to start the internal combustion engine (10), when it is determined that the start condition becomes satisfied:

for reversely rotating the crankshaft (24) using the motor (26) to compress an air in an expansion stroke cylinder (25), which is a cylinder which is in an expansion stroke while the engine is in the stopped state according to the automatic stop control;

for injecting the fuel from the fuel injector (39) to form an air-fuel mixture in the expansion stroke cylinder, and thereafter;

for generating the spark for ignition by the ignition device to ignite the air-fuel mixture in the expansion stroke cylinder so as to generate a first time combustion after the start condition becomes satisfied, to thereby cause a rotation in a forward rotation direction of the internal combustion engine (10);

for injecting the fuel from the fuel injector (39) to form an air-fuel mixture in a compression stroke cylinder (25), which is a cylinder which is in a compression stroke while the engine is in the stopped state according to the automatic stop control, with/while compressing an air in the compression stroke cylinder by the rotation in the forward rotation direction; and for generating the spark for ignition at a predetermined ignition timing by the ignition device (35) to ignite the air-fuel mixture in the compression stroke cylinder (25) so as to generate a second time combustion after the start condition becomes satisfied.

Further, the start control means is configured to:

determine which request, a specific start request or a start request other than the specific start request, satisfies the start condition, the specific start request being a start request caused by an driving operation of a driver of a vehicle on which the internal combustion engine (10) is mounted (S105);

make, one of only a maximum value of an engine generating torque generated by the first time combustion, only a maximum value of an engine generating torque generated by the second time combustion, and only maximum values of both of an engine generating torque generated by the first time combustion and an engine generating torque generated by the second time combustion, larger when it is determined that the start condition becomes satisfied by the specific start request as compared to when it is determined that the start condition becomes satisfied by the start request other than the specific start request (S106, S107, S201 to S205, S401 to S405, S509 to S511, and S518 to s520).

According to the study by the inventor, it is likely that the engine rotational speed is within the character frequency range until the engine rotational speed rises/increases to be equal to or higher than a certain speed by the second time combustion after the satisfaction of the start condition. Therefore, decreasing the maximum value of the engine generating torque at the first and the second combustions after the satisfaction of the start condition can make an amplitude of the vibration caused by the combustions smaller, to thereby suppress the vibration which the driver can recognize/feel/sense even if the engine resonates (vibrate sympathetically). Further, in a case where only either one of the maximum value of the engine generating torque caused by the first time combustion and the maximum value of the engine generating torque caused by the second time combustion is lowered/decreased, the amplitude of the vibration can be made smaller, since a force to cause the vibration within the character frequency range becomes smaller. Thus, even when the resonation (sympathetic vibration) occurs by the second time combustion after the satisfaction of the start condition, the vibration which the driver can recognize/feel/sense can be suppressed. It should be noted, however, when the third time combustion after the satisfaction of the start condition occurs, the engine rotational speed does not remain within the character frequency range, and thus, the amplitude of the vibration scarcely changes even if the engine generating torque caused by the third time combustion is made smaller. Accordingly, it is preferable that the air-fuel mixture be burnt in such a manner that a combustion efficiency becomes high with respect to the third time combustion after the satisfaction of the start condition and combustions thereafter.

In view of the above, according to the present invention apparatus, one of (1) only a maximum value of an engine generating torque generated by the first time combustion, (2) only a maximum value of an engine generating torque generated by the second time combustion, and (3) only maximum values of both of an engine generating torque generated by the first time combustion and an engine generating torque generated by the second time combustion, is made larger (enlarged) when the start condition becomes satisfied by the specific start request as compared to when the start condition becomes satisfied by the start request other than the specific start request. This increases an increasing rate of the engine rotational speed by the combustion(s), to thereby shorten the time (i.e., start response time) required for the engine rotational speed to reach the start completion rotational speed from the state in which the engine is stopped.

On the other hand, when the start condition becomes satisfied by the start request other than the specific start request, the value is made smaller as compared in the case where the start condition becomes satisfied by the specific start request, the value being one of:

only the maximum value of the engine generating torque generated by the first time combustion after the satisfaction of the start condition;

only the maximum value of the engine generating torque generated by the second time combustion after the satisfaction of the start condition; and only maximum values of both of the engine generating torque generated by the first time combustion and the engine generating torque generated by the second time combustion after the satisfaction of the start condition.

Accordingly, since the amplitude of the vibration of the engine can be made smaller, the possibility that the driver feels uncomfortable about the vibration can be lowered.

Further, in one of the aspects of the present invention apparatus, the start control means may be configured to make at least the maximum value of the engine generating torque generated by the first time combustion larger when it is determined that the start condition becomes satisfied by the specific start request as compared to when it is determined that the start condition becomes satisfied by the start request other than the specific start request. In addition, in this case, the start control means may be configured to operate the motor and the ignition device in such a manner that the piston position of the expansion stroke cylinder at the generation timing of the spark for ignition which causes the first time combustion is closer to the compression top dead center when it is determined that the start condition becomes satisfied by the specific start request as compared to when it is determined that the start condition becomes satisfied by the start request other than the specific start request (S201, S202, S204, S210, S211, S401, S402, S404, S410, S411, S509-S511, S516, and S517).

The substantial compression ratio becomes larger as the piston position of the expansion stroke cylinder is closer to the compression top dead center as long as an amount of air in the expansion stroke cylinder is fixed. Generally, in the spark-ignition internal combustion engine, an air-fuel mixture is combusted when the engine is being started while keeping an air-fuel ratio of the mixture at a predetermined air-fuel ratio (e.g., stoichiometric air-fuel ratio). Therefore, as long as an amount of air in the expansion stroke cylinder is fixed, an amount of fuel injected into the expansion stroke cylinder is fixed. If the amount of fuel injected into the expansion stroke cylinder is fixed, the maximum value of the engine generating torque becomes larger as the substantial compression ratio at the ignition timing becomes larger. Accordingly, when an amount of air in the expansion stroke cylinder is fixed, the maximum value of the engine generating torque during the combustion is larger as the piston position of the expansion stroke cylinder at the ignition timing is closer to the compression top dead center. Thus, the one of the aspect of the present invention can shorten the start response time, because the maximum value of the engine generating torque by the expansion stroke cylinder is made relative large when the start condition is satisfied by the specific start request. In addition, when the start condition is satisfied by the start request other than the specific start request, the one of the aspect of the present invention can decrease the amplitude of the vibration while the engine is being started, because the maximum value of the engine generating torque by the expansion stroke cylinder is made relative small.

In another aspect of the present invention apparatus, the internal combustion engine may further comprise a variable valve timing adjusting device (61) which is able to vary a valve opening timing and a valve closing timing of an intake valve, and the start control means may be configured to make at least a maximum value of the engine generating torque generated by the second time combustion larger when it is determined that the start condition becomes satisfied by the specific start request as compared to when it is determined that the start condition becomes satisfied by the start request other than the specific start request. In addition, in this case, the start control means may be configured to drive the variable valve timing adjusting device in such a manner that the valve closing timing of the intake valve of the compression stroke cylinder becomes more advanced timing and closer to an intake bottom dead center when it is determined that the start condition becomes satisfied by the specific start request as compared to when it is determined that the start condition becomes satisfied by the start request other than the specific start request (S201, S203, S205, S401, S403, S405, and S518-S520).

During the compression stroke, as long as the throttle valve opening degree is fixed, an amount of air remained in the compression stroke cylinder becomes larger as the valve closing timing of the intake valve becomes more advanced timing toward the intake bottom dead center from a certain timing after the intake bottom dead center. Generally, in the spark-ignition internal combustion engine, the air-fuel mixture is combusted when the engine is being started while/with keeping the air-fuel ratio of the mixture at the predetermined air-fuel ratio. Therefore, the amount of fuel injected into the compression stroke cylinder becomes larger as the amount of air remained in the compression stroke cylinder becomes larger. As long as the ignition timing is fixed, the maximum value of the engine generating torque becomes larger as the fuel injection amount becomes larger. Accordingly, the another aspect of the present invention apparatus can shorten the start response time, because the maximum value of the engine generating torque generated by the compression stroke cylinder is made relative large when the start condition is satisfied by the specific start request. In addition, the another aspect of the present invention apparatus can decrease the amplitude of the vibration when the engine is being started, because the maximum value of the engine generating torque generated by the compression stroke cylinder is made relative small when the start condition is satisfied by the start request other than the specific start request.

In the above case, the start control means may be configured to drive the variable valve timing adjusting device to retard a valve closing timing of the intake valve of the compression stroke cylinder in such a manner that the intake valve is opened when the internal combustion engine is in the stopped state according to the automatic stop control (S504).

According to the above aspect, the intake valve of the cylinder which is in the compression stroke while the internal combustion engine is in the stopped state according to the automatic stop control is in the opened state. Thus, a resistance in a period in which the motor reversely rotates the crankshaft is smaller, as compared to a case in which the intake valve of the cylinder which is in the compression stroke is in the closed state. As the resistance becomes smaller, an energy required for the motor to drive the crankshaft becomes smaller. Accordingly, the above configuration can improve the fuel efficiency.

In the above description, references used in the following descriptions regarding embodiments are added with parentheses to the elements of the present invention, for a better understanding of the present invention. However, those references should not be used to limit the scope of the invention.

DETAILED DESCRIPTION OF THE EMBODIMENTS

First Embodiment (Structure)

Figure 1:
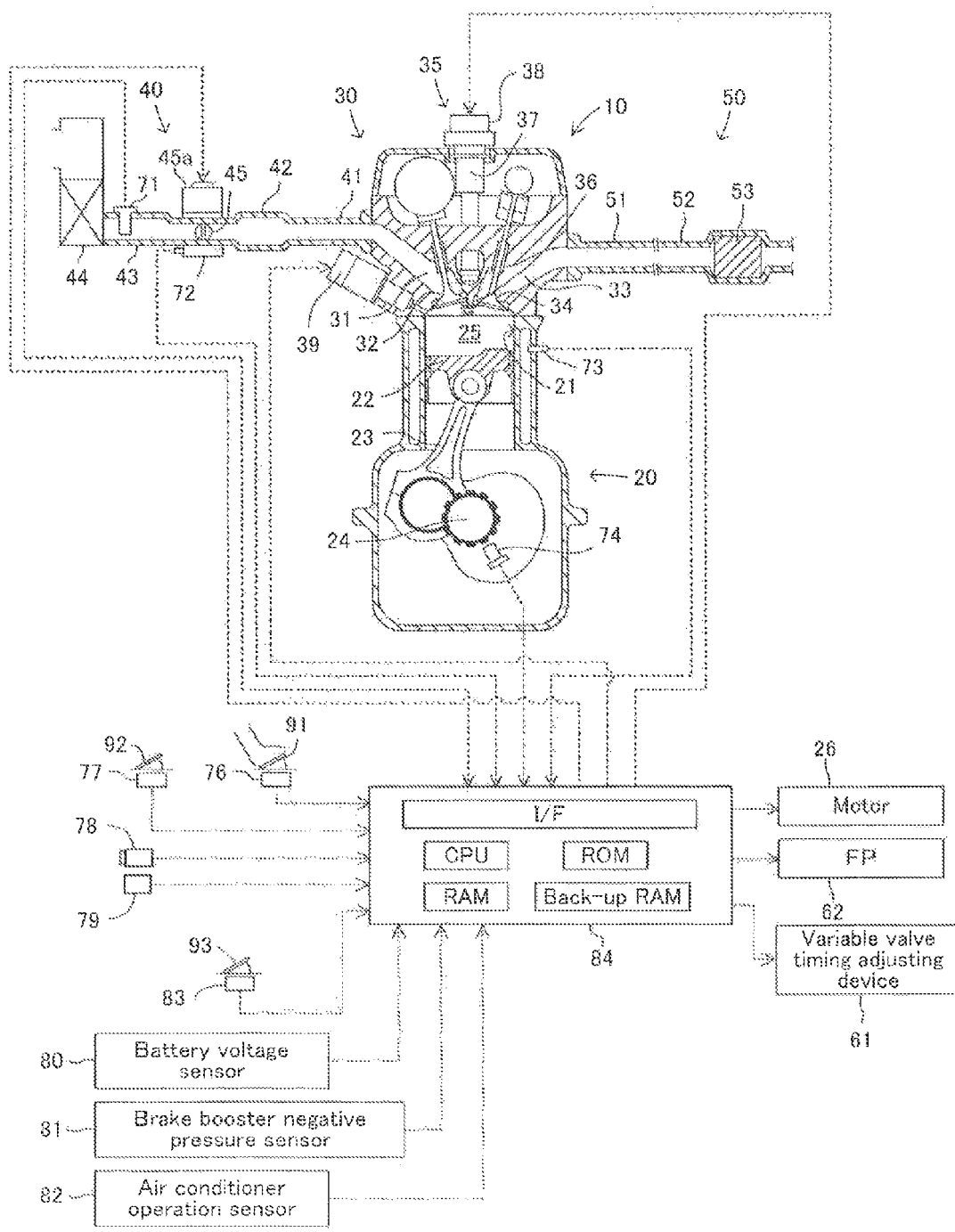
FIG. 1 is a schematic diagram of an internal combustion engine to which a "control apparatus for an internal combustion engine" according to a first embodiment of the present invention is applied and of the control apparatus.

A control apparatus for an internal combustion engine of a first embodiment according to the present invention (hereinafter, also referred to as a "first apparatus") is applied to an internal combustion engine (engine) 10 shown in FIG. 1.

The engine 10 is a multi-cylinder (in-line four-cylinders in the present embodiment)•four cycle•piston reciprocating•in-cylinder injection (direct injection)•spark ignition•gasoline fuel engine. The engine 10 is mounted on an unillustrated body of a vehicle through unillustrated engine mounts, as a power source (driving force source) for the vehicle.

The engine 10 comprises a cylinder block section 20 including a cylinder block, a lower case for the cylinder block, and an oil pan; a cylinder head section 30 fixed on the cylinder block section 20; an intake system 40 for supplying an air to the cylinder block section 20; and an exhaust system 50 for discharging an exhaust gas from the cylinder block section 20.

The cylinder block section 20 includes cylinders 21, pistons 22, connecting rods 23, and a crankshaft 24. The piston 22 reciprocates within the cylinder 21. The reciprocating motion of the piston 22 is transmitted to the crankshaft 24 through the connecting rod 23, thereby the crankshaft 24 is rotated. The cylinder 21, the piston 22 and the cylinder head section 30 forms a combustion chamber 25.

Figure 2:
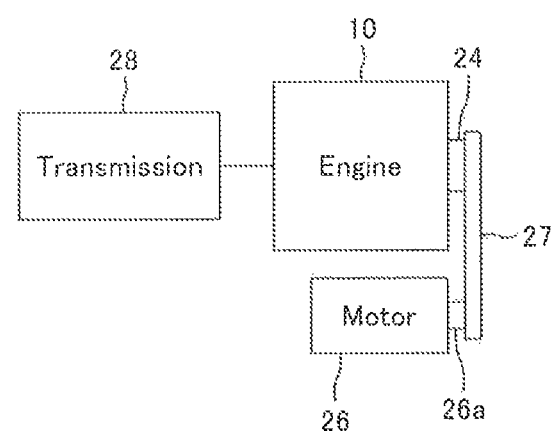
FIG. 2 is a schematic configuration diagram of a driving system of a vehicle on which the control apparatus for an internal combustion engine according to the first embodiment of the present invention is mounted.

As shown in FIG. 2, the crankshaft 24 is provided with an unillustrated crankshaft pulley. The crankshaft pulley is connected with an unillustrated motor pulley fixed to a motor shaft 26a of a motor 26 through a belt 27 so that a driving force (torque) can be transmitted between the crankshaft 24 and the motor shaft 26a. The driving force generated by the engine 10 is transmitted to the transmission 28 through the crankshaft 24, and is transmitted to unillustrated wheels through the transmission 28, whereby the vehicle can travel/run.

The motor 26 can forwardly and reversely rotate when electric power is supplied to the motor 26 from an unillustrated vehicle battery. Therefore, the motor 26 can rotate the crankshaft 24 in a forward rotation direction and a reverse rotation direction. The forward rotation direction of the crankshaft 24 is a rotation direction of the crankshaft 24 when the internal combustion 10 is being operated (is running) by a force (engine generating torque) generated owing to combustions of air-fuel mixture in the combustion chambers 25. The reverse rotation direction of the crankshaft 24 is a rotation direction opposite to the forward rotation direction of the crankshaft 24.

Referring back to FIG. 1, the cylinder head section 30 includes intake ports 31 communicating with the combustion chambers 25; intake valves 32 for opening and closing the intake ports 31; exhaust ports 33 communicating with the combustion chambers 25; exhaust valves 34 for opening and closing the exhaust ports 33; ignition devices 35 for igniting the air-fuel mixtures in the combustion chambers 25; and fuel injectors 39 for directly injecting fuels into the combustion chambers 25.

The ignition device 35 includes a spark plug 36; an ignition coil 37 for generating a high voltage to be applied to the spark plug 36; and an igniter 35. An electrode section (spark generating portion for ignition) of the spark plug 36 is exposed in the combustion chamber 25 at an upper and central portion of the combustion chamber 25.

The fuel injector 39 is disposed at the cylinder head section 30 in such a manner that its fuel injection hole is exposed in the combustion chamber 25. The fuel injector 39 opens in response to an instruction from the ECU 84 to inject the fuel directly into the combustion chamber 25. Namely, the fuel injector 39 is a so-called "in-cylinder injector or direct injection valve."

The intake system 40 includes an intake manifold 41 communicating with the intake ports 31; a surge tank 42 communicating with the intake manifold 41; and an intake pipe 43 whose one end is communicated with the surge tank 42. The intake ports 31, the intake manifold 41, the surge tank 42, and the intake pipe 43 constitute an intake passage.

Further, the intake system 40 comprises an air filter 44 and a throttle valve 45. The throttle valve 45 is rotatably supported by the intake pipe 43. A throttle valve actuator 45a comprises a DC motor and drives the throttle valve 45 using the DC motor in response to an instruction from the ECU 84 to change an opening degree of the throttle valve 45.

The exhaust system 50 includes an exhaust manifold 51 communicating with the exhaust ports 33, and an exhaust pipe 52 connected with the exhaust manifold 51. The exhaust ports 33, the exhaust manifold 51 and the exhaust pipe 52 constitute an exhaust passage.

Further, the exhaust system 50 comprises a three way catalyst (three way catalytic unit, exhaust purification catalyst) 53. The three way catalyst 53 is disposed in the exhaust pipe 52.

The engine 10 comprises a variable valve timing adjusting device 61. In the present embodiment, the valve timing adjusting device 61 includes an unillustrated electrically-driven actuator. The valve timing adjusting device 61 directly changes a phase angle of an unillustrated camshaft with respect to the crankshaft 24 using the electrically-driven actuator in response to an instruction from the ECU 84 so as to change an opening timing and a closing timing of the intake valves 32. It should be noted that the valve timing adjusting device 61 does not necessarily include the electrically-driven actuator, and may have any structures as long as it can change the opening timing and the closing timing of the intake valves 32 in response to the instruction from the ECU 84.

The engine 10 comprises a fuel pump system 62. The fuel pump system 62 includes "a low-pressure pump, a high-pressure pump, and an electromagnetic valve for adjusting a fuel pressure", that are not illustrated. The fuel pump system 62 pumps a fuel up from an unillustrated fuel tank, and adjusts the pressure of the fuel in such a manner that the pressure of the fuel becomes equal to a target fuel pressure in response to an instruction from the ECU 84, to supply the fuel to the fuel injectors 39, using the pumps.

It should be noted that the "ECU" is an abbreviation of an electric control unit, and is an electronic control circuit which comprises, as a main component, a microcomputer including a CPU, a ROM, a RAM, an interface, or the like. The CPU executes instructions (routines, programs) stored in the memory (ROM) so as to realize various functions described later. The ECU 84 are connected with sensors and switches described below to receive signals from them.

Air flowmeter 71: The air flowmeter 71 measures a mass flow rate (intake air flow rate Ga) of an air flowing through the intake pipe 43 and being introduced into the engine 10 to output a signal indicative of the intake air flow rate Ga.

Throttle position sensor 72: The throttle position sensor 72 detects the opening degree of the throttle valve 45 (throttle valve opening angle TA) to output a signal indicative of the throttle valve opening angle TA.

Water temperature sensor 73: The water temperature sensor 73 measures a temperature (cooling water temperature THW) of cooling water for the engine 10 to output a signal indicative of the cooling water temperature THW.

Crank position sensor 74: The crank position sensor 74 outputs one pulse signal every time the crankshaft 24 rotates by a constant degree (e.g., 10 [deg]). The ECU 84 acquires a crank angle of the engine 10 with respect to a top dead center of compression stroke of a predetermined specific cylinder (the first cylinder in the present example) based on the signals from the crank position sensor 74 and an unillustrated cam position sensor. The crank angle of the engine 10 is a rotation angle of the crankshaft 24, and is hereinafter referred to as a "crank angle." Further, the ECU 84 acquires an engine rotational speed NE based the signals from the crank position sensor 74.

Accelerator operation amount sensor 76: The accelerator operation amount sensor 76 detects an operation amount Accp of an accelerator pedal 91 to output a signal indicative of the operation amount Accp.

Brake switch 77: The brake switch 77 detects an operation of a brake pedal 92 to output a signal indicative of the operation of the brake pedal 92.

Vehicle speed sensor 78: The vehicle speed sensor 78 measures a speed (vehicle speed SPD) of the vehicle on which the engine 10 is mounted to output a signal indicative of the vehicle speed SPD.

Ignition switch 79: The ignition switch 79 is a switch which is operated by a driver to start or stop the operation of the engine 10. The ignition switch 79 supplies the ECU 84 with a signal indicative of on or off state of the ignition switch 79.

Battery voltage sensor 80: The battery voltage sensor 80 detects a voltage of a battery of the vehicle on which the engine 10 is mounted to output a signal indicative of the voltage of the battery.

Brake booster negative pressure sensor 81: The brake booster negative pressure sensor 81 detects an operation pressure (brake booster negative pressure) of an unillustrated brake booster of the vehicle on which the engine 10 is mounted to output a signal indicative of the brake booster negative pressure.

Aft conditioner operation sensor 82: The air conditioner operation sensor 82 detects whether or not an air conditioner is set in an operating state to output a signal indicative of whether or not the air conditioner is set in the operating state.

Clutch switch 83: The clutch switch 83 detects an operation of a clutch pedal 93 to output a signal indicative of the operation of the clutch pedal 93.

The ECU 84 transmits instruction signals (drive signals) to the various actuators (the motor 26, the throttle valve actuator 45*a*, the ignition devices 35, the fuel injectors 29, and the like). The ECU 84 can control the direction of the rotation of the motor 26.

(Outline of an Operation of the First Apparatus)

The first apparatus starts to operate the engine 10 based on the operation of the ignition switch 79, and thereafter, performs an automatic stop control in which it stops the fuel injection from the fuel injectors 39 to stop the rotation of the engine 10 when a predetermined automatic stop condition is satisfied.

The automatic stop condition of the first apparatus is satisfied when all of conditions described below are satisfied.

(1) The brake pedal 92 is being depressed (is in the operating state). This is detected based on the signal from the brake switch 77.

(2) The accelerator pedal 91 is not being depressed (is not in the operating state). This is detected based on the operation amount Accp of the accelerator pedal 91 detected by the accelerator operation amount sensor 76.

(3) The vehicle speed SPD is equal to or lower than a predetermined vehicle speed SPDth. This is detected based on the vehicle speed SPD detected by the vehicle speed sensor 78.

Further, the first apparatus performs a start control to automatically start the engine 10 when an automatic start condition (hereinafter, referred to as a "start condition") described below is satisfied while the engine 10 has been stopped (that is, during the engine is in the automatic stopped state) due to the automatic stop control. The start condition in the present embodiment is satisfied when a start request is generated, and is classified into two kinds described below.

(1) A condition to be satisfied based on a start request (hereinafter, referred to as a "first start request" or a "specific start request) which is caused by a driving operation owing to the driver's intention to start to run the vehicle.

(2) A condition to be satisfied based on a start request (which is a start request other than the first start request, and hereinafter, referred to as a "second start request") which is caused by certain reasons other than the driving operation owing to the driver's intention to start to run the vehicle.

For example, the first start request is generated when any one of cases described below occurs.

A case in which a state of the brake pedal 92 changes from a state where the brake pedal 92 is depressed/operated to a state where the brake pedal 92 is not depressed/operated. This is detected based on the signal from the brake switch 77.

A case in which a state of the clutch pedal 93 changes from a state where the clutch pedal 93 is not depressed/operated to a state where the clutch pedal 93 is depressed/operated. This is detected based on the signal from the clutch switch 83.

For example, the second start request is generated when any one of cases described below occurs.

A case in which the ECU 84 obtains the battery voltage from the battery voltage sensor 80 and determines that the battery voltage is lower than a predetermined voltage.

A case in which the ECU 84 obtains the brake booster negative pressure from the brake booster negative pressure sensor 81 and determines that the (magnitude of the) brake booster negative pressure is smaller than a predetermined negative pressure.

A case in which the ECU 84 determines based on the signal from the air conditioner operation sensor 82 that a state of the air conditioner changes from a non-operating condition to an operating condition.

When the start condition is satisfied (that is, when either the first start request or the second start request is generated), the first apparatus performs the start control (automatic start control) to automatically start the engine 10 as described below. It should be noted that the ignition/firing order is in order of the first cylinder, the third cylinder, the fourth cylinder, and the second cylinder. Further, when the first cylinder is at the top dead center of compression stroke, the crank angle is equal to 0° (720°).

When the start condition is satisfied while the engine 10 has been stopped automatically (the engine is in an automatic stopped state), the first apparatus reversely rotates the engine 10 using the motor 26, and injects the fuel into a cylinder (hereinafter, referred to as an "expansion stroke cylinder") which is in the expansion stroke while the engine 10 is in the stopped state so as to form an air-fuel mixture in the expansion stroke cylinder. Thereafter, the first apparatus has the ignition device 35 generate a spark for an ignition in the expansion stroke cylinder before the piston 22 of that expansion stroke cylinder reaches the top dead center in compression stroke so as to generate a combustion in the expansion stroke cylinder. As a result, the engine 10 starts to forwardly rotate so that an air in the cylinder (hereinafter, referred to as a "compression stroke cylinder") which is in the compression stroke while the engine 10 is in the stopped state is compressed. Further, the first apparatus injects the fuel into that compression stroke cylinder to form an air-fuel mixture in the compression stroke cylinder, and thereafter, has the ignition device 35 generate a spark for an ignition in the compression stroke cylinder at an appropriate time point so as to generate the combustion in the compression stroke cylinder. Consequently, the engine continues to forwardly rotate while increasing the engine rotational speed. Thereafter, the first apparatus sequentially forms an air-fuel mixture in the cylinder whose stroke becomes the compression stroke, and burns the mixture to increase the engine rotational speed up to a start completion rotational speed which is roughly equal to an idling rotational speed. This finishes the start of the engine 10.

More specifically, the ECU 84 firstly stores a crank angle (hereinafter, referred to as an "engine stopped timing crank angle") at a point in time at which the operation of the engine 10 has just stopped (more specifically, when the rotation of the crankshaft 24 has stopped) owing to the automatic stop control into the RAM. Thereafter, when the start condition is satisfied, the ECU 84 reads out the engine stopped timing crank angle from the RAM to determine which cylinder is the expansion stroke cylinder based on the engine stopped timing crank angle. Typically, the engine 10 stops when the crank angle of the compression stroke cylinder is roughly equal to 90° before the compression top dead center of the compression stroke cylinder (i.e., when the crank angle of the expansion stroke cylinder is roughly equal to the 90° after the compression top dead center of the expansion stroke cylinder). Namely, the engine stopped timing crank angle is typically any one of around 90°, around 270°, around 450°, and around 630°.

The first cylinder is in the expansion stroke when the crank angle is between 0 and 180°. The third cylinder is in the expansion stroke when the crank angle is between 180 and 360°. The fourth cylinder is in the expansion stroke when the crank angle is between 360 and 540°. The second cylinder is in the expansion stroke when the crank angle is between 540 and 720°.

Accordingly, the ECU 84 can determine that the first cylinder is the expansion stroke cylinder when the engine stopped timing crank angle is within a range from 0° to 180°. The ECU 84 can determine that the third cylinder is the expansion stroke cylinder when the engine stopped timing crank angle is within a range from 180° to 360°. The ECU 84 can determine that the fourth cylinder is the expansion stroke cylinder when the engine stopped timing crank angle is within a range from 360° to 540°. The ECU 84 can determine that the second cylinder is the expansion stroke cylinder when the engine stopped timing crank angle is within a range from 540° to 720°.

Figure 3:
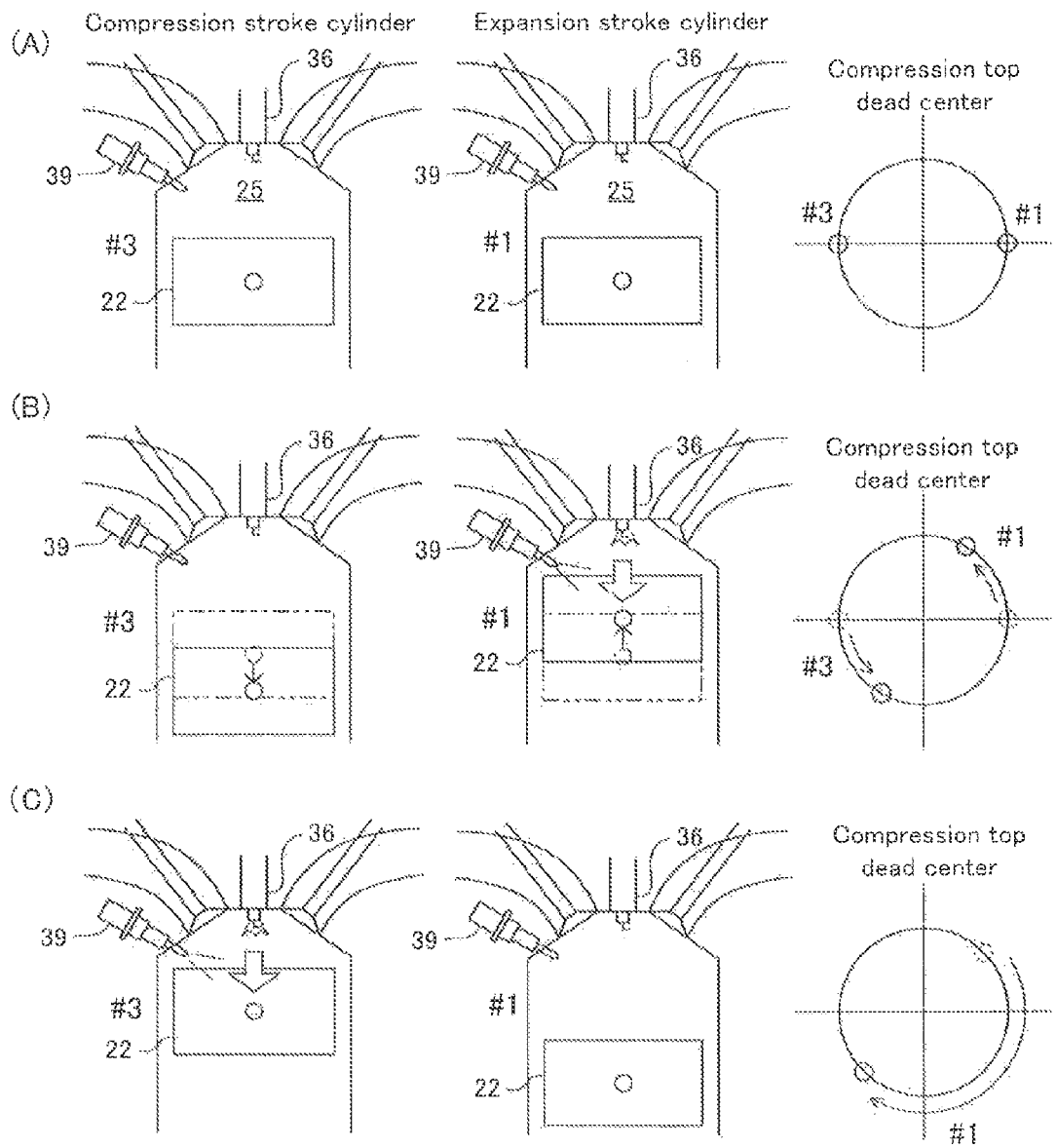
FIG. 3 is a figure to describe operations of the internal combustion engine according to a start control executed by the ECU shown in FIG. 1.

Referring to FIG. 3, operating states of "the expansion stroke cylinder and the compression stroke cylinder" immediately after the start condition was satisfied, and thus the start control was started will next be described. In FIG. 3, the left column illustrates the compression stroke cylinders, the middle column illustrates the expansion stroke cylinders, and the right column illustrates positions of the pistons of the expansion stroke cylinder and the compression stroke cylinder. It is assumed that the engine stopped timing crank angle is 90°. In this case, the expansion stroke cylinder is the first cylinder (#1), and the compression stroke cylinder is the third cylinder (#3). (A) of FIG. 3 shows "the third cylinder (compression stroke cylinder) #3, the first cylinder (expansion stroke cylinder) #1, and crank angles corresponding to the positions of those cylinders", in order from left to right.

When the start condition is satisfied during the engine 10 is in the automatic stopped state, the ECU 84 reversely rotates the crankshaft 24 using the motor 26 within a range from the engine stopped timing crank angle to the compression top dead center of the expansion stroke cylinder (#1), and has the fuel injector 39 of the expansion stroke cylinder (#1) inject the fuel into the expansion stroke cylinder (#1).

As a result, as shown in (B) of FIG. 3, the piston 22 of the expansion stroke cylinder (#1) moves upward from a stopped position shown by a two-dot chain line to a position just before the top dead center. At that time, the air remaining in the expansion stroke cylinder (#1) and the fuel injected from the fuel injector 39 form an air-fuel mixture. The mixture is compressed so that a temperature of the mixture rises. Accordingly, the mixture having a high ignitability is formed in the expansion stroke cylinder (#1). The ECU 84 operates the ignition device 35 of the expansion stroke cylinder (#1) at a certain time point to generate a spark for an ignition from the ignition plug 36, whereby burns the mixture.

As a result, a pressure (combustion pressure) in the expansion stroke cylinder (#1) becomes high, and thus, the engine generating torque becomes large. This causes the crankshaft 24 to forwardly rotate.

Consequently, as shown in (C) of FIG. 3, the crankshaft 24 forwardly rotates and the piston 22 of the expansion stroke cylinder (#1) moves toward the expansion bottom dead center. Simultaneously, the piston 22 of the compression stroke cylinder (#3) moves toward the compression top dead center. Thereafter, the ECU 84 has the fuel injector 39 of the compression stroke cylinder inject the fuel into the compression stroke cylinder when/after the intake valve 32 of the compression stroke cylinder closes, and operates the ignition device 35 of the compression stroke cylinder (#3) at a certain time point to generate a spark for an ignition from the ignition plug 36, whereby burns the mixture in the compression stroke cylinder (#3). As a result, the engine generating torque becomes large. This causes the crankshaft 24 to forwardly rotate. Accordingly, the rotational speed of the crankshaft 24 (namely, the engine rotational speed NE) further becomes higher. Thereafter, in the same way as the normal operation of the engine 10, the combustions are generated according to the ignition order, and the start control ends when the engine rotational speed NE increases to reach the start completion rotational speed.

Meanwhile, for example, the start condition is satisfied when the driver performs the driving operation with an intention to start to run the vehicle (namely, when the above described first start request is generated). When the first request is generated while the engine 10 is in the automatic stopped state, and thus, when the start condition becomes satisfied, it is important to shorten a time (start response time) from a point in time at which the start condition becomes satisfied to a point in time at which the engine rotational speed NE increases and reaches the start completion rotational speed (e.g., 700 [rpm]) as much as possible. The start response time becomes shorter as a maximum value of the engine generating torque of each of the cylinders is larger after the satisfaction of the start condition.

However, the engine rotational speed at a point in time immediately after the crankshaft 24 starts to rotate is lower than the engine rotational speed when the engine 10 is in the idling state. In addition, the character frequency of the engine 10 is smaller than a frequency ($=1/T$) determined by a combustion interval (which is a time between the two consecutive combustions) T when the engine 10 is in the idling state. Accordingly, immediately after the crankshaft 24 has started to forwardly rotate, the engine rotational speed is in a speed range (hereinafter, referred to as a "character frequency range") which sympathetically vibrates the engine 10. Therefore, the engine 10 sympathetically vibrates so that the vibration of the engine 10 is amplified. As a result, the vibration of the engine 10 becomes very large. Especially, it is likely that the engine rotational speed is in the character frequency range before the engine rotational speed becomes sufficiently high owing to the second combustion after the start condition becomes satisfied.

Figure 4:
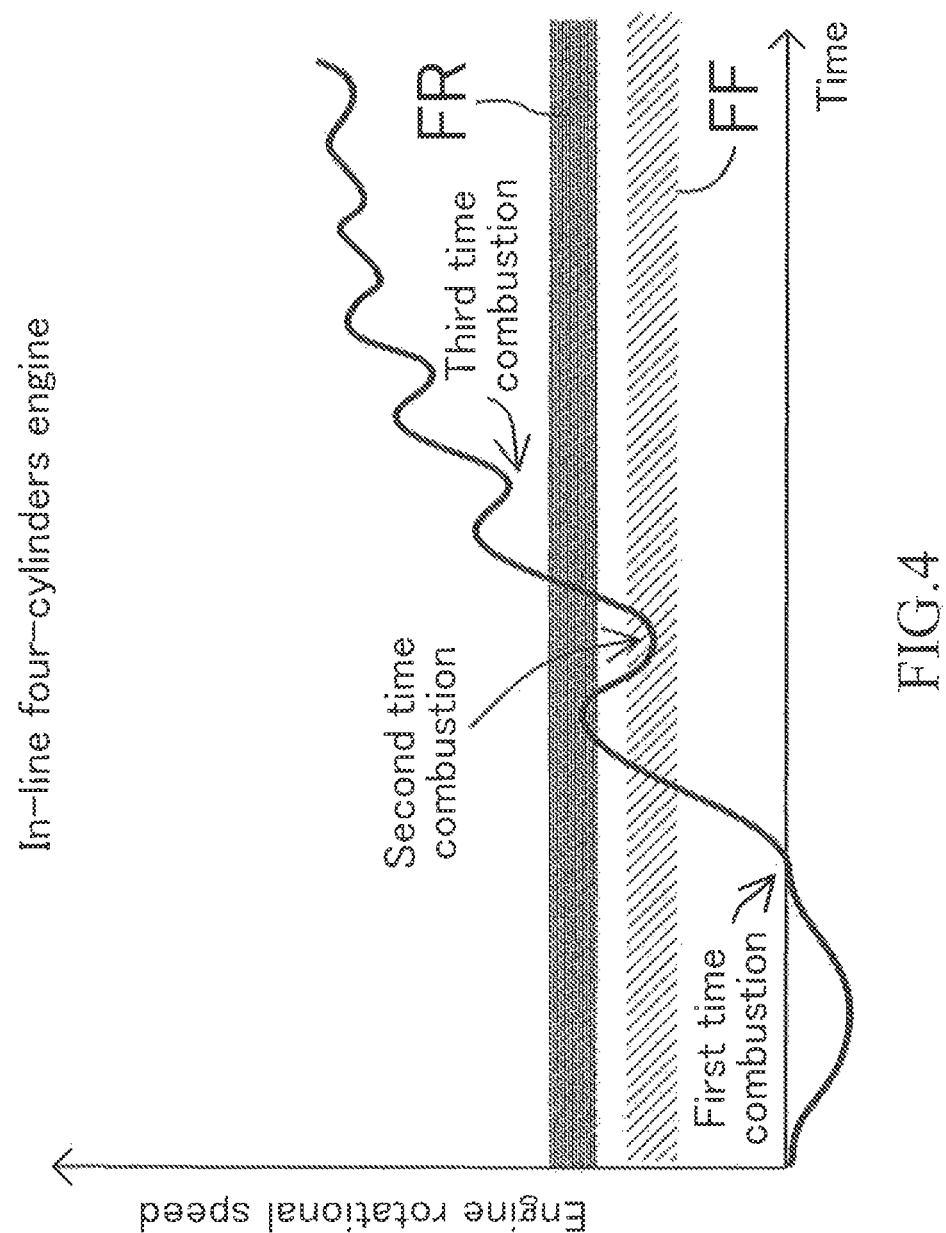
FIG. 4 is a figure to describe the start control executed by the ECU shown in FIG. 1.

Furthermore, the amplitude of the vibration of the engine 10 becomes larger, as the maximum value of the engine generating torque caused by the combustion is larger. Therefore, as the maximum value of the engine generating torque caused by the combustion in the expansion stroke cylinder and the maximum value of the engine generating torque caused by the combustion in the compression stroke cylinder are larger, the engine 10 vibrates more greatly due to the sympathetic vibration, whereby the driver may feel uncomfortable. A graph shown in FIG. 4 shows the engine rotational speed after the start condition becomes satisfied. It can be understood from FIG. 4 that the engine rotational speed in a period from a time point after the first combustion after the satisfaction of the start condition to a time point immediately after the second combustion after the satisfaction of the start condition is within the character frequency range (for FF and for FR). This may cause the engine 10 to greatly vibrate due to the sympathetic vibration in a period from the time point after the first combustion after the satisfaction of the start condition to a time point before the third combustion after the satisfaction of the start condition. It should be noted that a belt-like range denoted by FF indicates the character frequency range of the engine 10 mounted on a front engine front drive vehicle, and a belt-like range denoted by FR indicates the character frequency range of the engine 10 mounted on a front engine rear drive vehicle.

As described above, when the start condition becomes satisfied owing to the occurrence of the first start request, it is required to start the engine immediately. Thus, in this case, it is required to shorten the start response time rather than suppressing the vibration when the engine is started. Further, in this case, since the driver expects the start of the engine 10, it is unlikely that the driver feels uncomfortable even when the vibration is large. In view of the above, the ECU 84 operates the engine 10 in such a manner that the maximum value of the engine generating torque owing to the first combustion and the maximum value of the engine generating torque owing to the second combustion become larger when the start condition is satisfied owing to the first start request, as compared to a case in which the start condition is satisfied owing to the second start request. This can shorten the time (start response time) from a point in time at which the engine is in the stopped state to a point in time at which the engine rotational speed reaches the start completion rotational speed which is roughly equal to the engine rotational speed when the engine is in the idling state, when the start condition becomes satisfied owing to an occurrence of the first start request.

On the other hand, the driver is easy to feel the vibration when the start condition becomes satisfied owing to the occurrence of the second start request, since the engine 10 starts irrespective of the driver's intention. In view of the above, the ECU 84 operates the engine 10 in such a manner that the maximum value of the engine generating torque owing to the first combustion and the maximum value of the engine generating torque owing to the second combustion become smaller when the start condition is satisfied owing to the second start request, as compared to a case in which the start condition is satisfied owing to the first start request. As a result, when the start condition is satisfied owing to the second start request, the engine 10 can be started without the large vibration of the engine 10, whereby, a possibility that the driver of the vehicle feels uncomfortable about/with the vibration of the engine 10 can be reduced.

(Specific Operation)

Specific operations of the CPU of the ECU 84 (hereinafter, simply refereed to as a "CPU") will next be described. The CPU repeatedly executes processes of routines shown in FIG. 5 and FIG. 6 every time a predetermined time elapses. Therefore, at an appropriate time point, the CPU proceeds to S101 shown in FIG. 5 to determine whether or not the engine 10 is in the automatic stopped state (i.e., whether or not the rotation of the engine 10 is in the stopped state owing to the automatic stop control). It should be noted that, as described above, when the automatic stop condition is satisfied while the engine 10 is in the operating state, the CPU executes the unillustrated routine to stop injecting the fuel from the fuel injectors 39 so as to stop the rotation of the engine 10. When the engine 10 is not in the automatic stopped state, the CPU makes a "No" determination at S101 to tentatively terminate the present routine.

In contrast, when the engine 10 is in the automatic stopped state, the CPU makes a "Yes" determination at S101 to proceed to S102, at which the CPU acquires/obtains from the RAM a valve closing timing IVC0 of the intake valve 32 of the expansion stroke cylinder at a time point immediately before the engine 10 had just stopped according to the automatic stop control. It should be noted that the CPU stores into the RAM the valve closing timing IVC0 of the intake valve 32 which is set at a time point immediately before the engine 10 stops according to the automatic stop control. Thereafter, the CPU proceeds to S103 to calculate a fuel injection amount TAU1 of a fuel to be injected into the expansion stroke cylinder based on the IVC0. Since an air amount in the expansion stroke cylinder can be estimated based on the IVC0, the fuel injection amount TAU1 can be calculated based on a target air-fuel ratio (stoichiometric air-fuel ratio, in the present embodiment) and the estimated air amount. Specifically, the CPU applies the IVC0 to a look-up table to calculate the TAU1. Thereafter, the CPU proceeds to S104 to determine whether or not the above described start condition becomes satisfied (namely, whether or not either one of the first start request and the second start request is generated). If the start condition is not satisfied, the CPU makes a "No" determination at S104 to tentatively terminate the present routine.

In contrast, if the start condition is satisfied, the CPU makes a "Yes" determination at S104 to proceed to S105, at which the CPU determines whether or not the start condition is satisfied based on the first start request described above. In other words, the CPU determines, at S105, which request has caused the start condition to be satisfied, the first start request, or the second start request. When the CPU determines that the first request has caused the start condition to be satisfied at S105, it proceeds to S106 to set a start request flag X to "1." In contrast, when the CPU determines that the second request other than the first request has caused the start condition to be satisfied at S105, it proceeds to S107 to set a start request flag X to "0."

The CPU proceeds to S201 shown in FIG. 6 from either S106 or S107 to determine whether the start request flag X is set at "1." When the start request flag X is set at "1", the CPU makes a "Yes" determination at S201 to proceed to S202, at which the CPU sets a rotation amount θ of the crankshaft 24 in the reverse direction by the motor 26 to a first rotation amount θ1, which will be described later with referring to FIG. 8. Thereafter, the CPU proceeds to S203 to set a valve closing timing IVC of the intake valve 32 of the compression stroke cylinder to a first valve closing crank angle IVC1, which will be described later with referring to FIG. 9.

Subsequently, the CPU proceeds to S206 to have the motor 26 start to rotate the crankshaft 24 in the reverse rotation direction. Thereafter, the CPU proceeds to S207 to calculate an amount TAU2 of a fuel to be injected into the compression stroke cylinder based on the valve closing timing IVC of the intake valve 32 of the compression stroke cylinder. In this example, the CPU uses a look-up table which in advance defines a relationship between the IVC and the fuel injection amount for the calculation. It should be noted that, when the value of the start request flag X is "1", the valve closing timing IVC of the intake valve 32 has been set at the first valve closing crank angle IVC1, at S203. Thereafter, the CPU proceeds to S208 to determine whether or not the present time point is an injection timing for the expansion stroke cylinder. In the present embodiment, the injection timing for the expansion stroke cylinder is a first crank angle θinj1 after the compression top dead center of the expansion stroke cylinder.

When the present time point is not the injection timing of the expansion stroke cylinder, the CPU makes a "No" determination at S208 to repeatedly make the determination of S208 until the injection timing of the expansion stroke cylinder arrives. When the injection timing of the expansion stroke cylinder arrives, the CPU makes a "Yes" determination at S208 to proceed to S209, at which the CPU injects the fuel of fuel injection amount TAU1 into the expansion stroke cylinder from the fuel injector 39 provided to the expansion stroke cylinder.

Subsequently, the CPU proceeds to S210 to determine whether or not an actual rotation amount of the crankshaft 24 in the reverse rotation direction by the motor 26 becomes equal to the rotation amount θ. When the actual rotation amount of the crankshaft 24 in the reverse rotation direction by the motor 26 has not become equal to the rotation amount θ, the CPU makes a "No" determination at S210 to repeatedly make the determination of S210 until the actual rotation amount of the crankshaft 24 in the reverse rotation direction by the motor 26 becomes equal to the rotation amount θ. It should be noted that, when the start request flag X is "1", the rotation amount θ has been set at the first rotation amount θ1 at S202. When the actual rotation amount of the crankshaft 24 in the reverse rotation direction by the motor 26 becomes equal to the rotation amount θ, the CPU makes a "Yes" determination at S210 to proceed to S211, at which the CPU has the ignition device 35 of the expansion stroke cylinder generate the spark for ignition. That is, CPU ignites the air-fuel mixture in the expansion stroke cylinder so as to cause the combustion. It should be noted that the CPU stops energizing (driving) the motor 26 at this time point.

Subsequently, the CPU proceeds to S212 to determine whether or not the intake valve 32 of the compression stroke cylinder has closed. More specifically, the CPU determine whether or not the present/current crank angle has reached the valve closing timing IVC of the intake valve 32 of the compression stroke cylinder, at S212. It should be noted that, when the value of the start request flag X is "1," the valve closing timing IVC of the intake valve 32 has been set at the first valve closing crank angle (timing) IVC1 at S203. When the intake valve 32 of the compression stroke cylinder has not closed, the CPU makes a "No" determination at S212 to repeats the determination at S212 until the intake valve 32 of the compression stroke cylinder closes. When the intake valve 32 of the compression stroke cylinder has closed, the CPU makes a "Yes" determination at S212 to proceed to S213, at which the CPU injects the fuel of the fuel injection amount TAU2 into the compression stroke cylinder.

Subsequently, the CPU proceeds to S214 to determine whether or not the present time point is an ignition timing for the compression stroke cylinder. When the present time point is not the ignition timing of the compression stroke cylinder, the CPU makes a "No" determination at S214 to repeatedly make the determination of S214 until the ignition timing for the compression stroke cylinder arrives. When the ignition timing for the compression stroke cylinder arrives, the CPU makes a "Yes" determination at S214 to proceed to S215, at which the CPU has the ignition device 35 of the compression stroke cylinder generate the spark for ignition. Then, the CPU tentatively terminates the present routine. That is, CPU ignites the air-fuel mixture in the compression stroke cylinder so as to cause the combustion.

In contrast, when the start request flag X has been set at "0", the CPU makes a "No" determination at S201 to proceed to S204, at which the CPU sets the rotation amount of the crankshaft 24 in the reverse rotation direction by the motor 26 to a second rotation amount θ2. The second rotation amount θ2 is smaller than the first rotation amount θ1. The second rotation amount θ2 will be described later with referring to FIG. 8. Thereafter, the CPU proceeds to S205 to set the valve closing timing IVC of the intake valve 32 of the compression stroke cylinder to a second valve closing timing (second valve closing crank angle) IVC2, which will be described later with referring to FIG. 9. The second valve closing timing IVC2 is set at a timing closer to the compression top dead center of the compression stroke cylinder than the first valve closing timing IVC1. Thereafter, the CPU executes the processes from S206 to S216 described above. Note, however, that at S210, the CPU determines whether or not the actual rotation amount of the crankshaft 24 in the reverse rotation direction reaches the rotation amount θ which is equal to the second rotation amount θ2. Further, the CPU determines whether or not the present/current crank angle has reached the valve dosing timing IVC of the intake valve 32 of the compression stroke cylinder, the closing timing IVC being the second valve closing timing IVC2, at S212.

Figure 5:
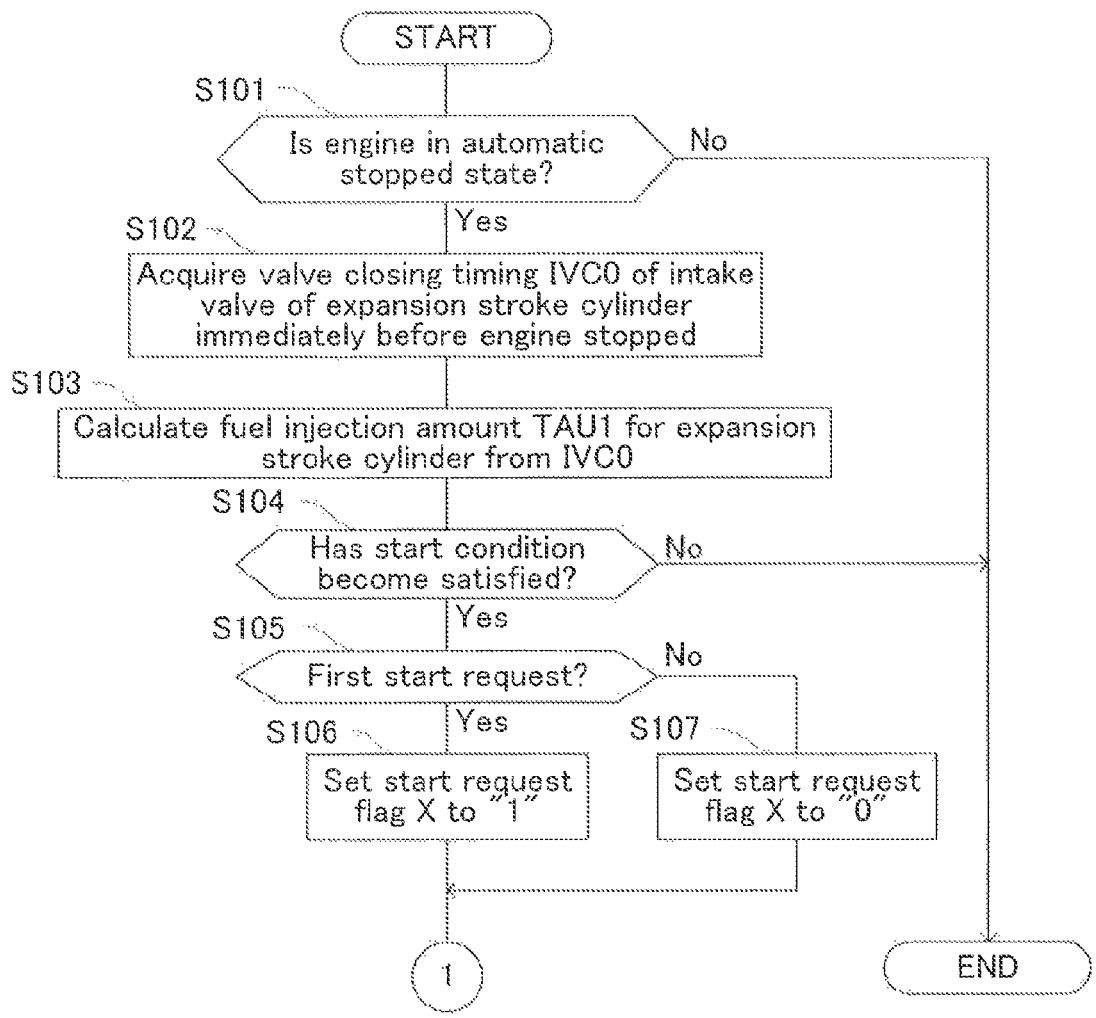
FIG. 5 is a flowchart showing a routine executed by the ECU shown in FIG. 1.
Figure 6:
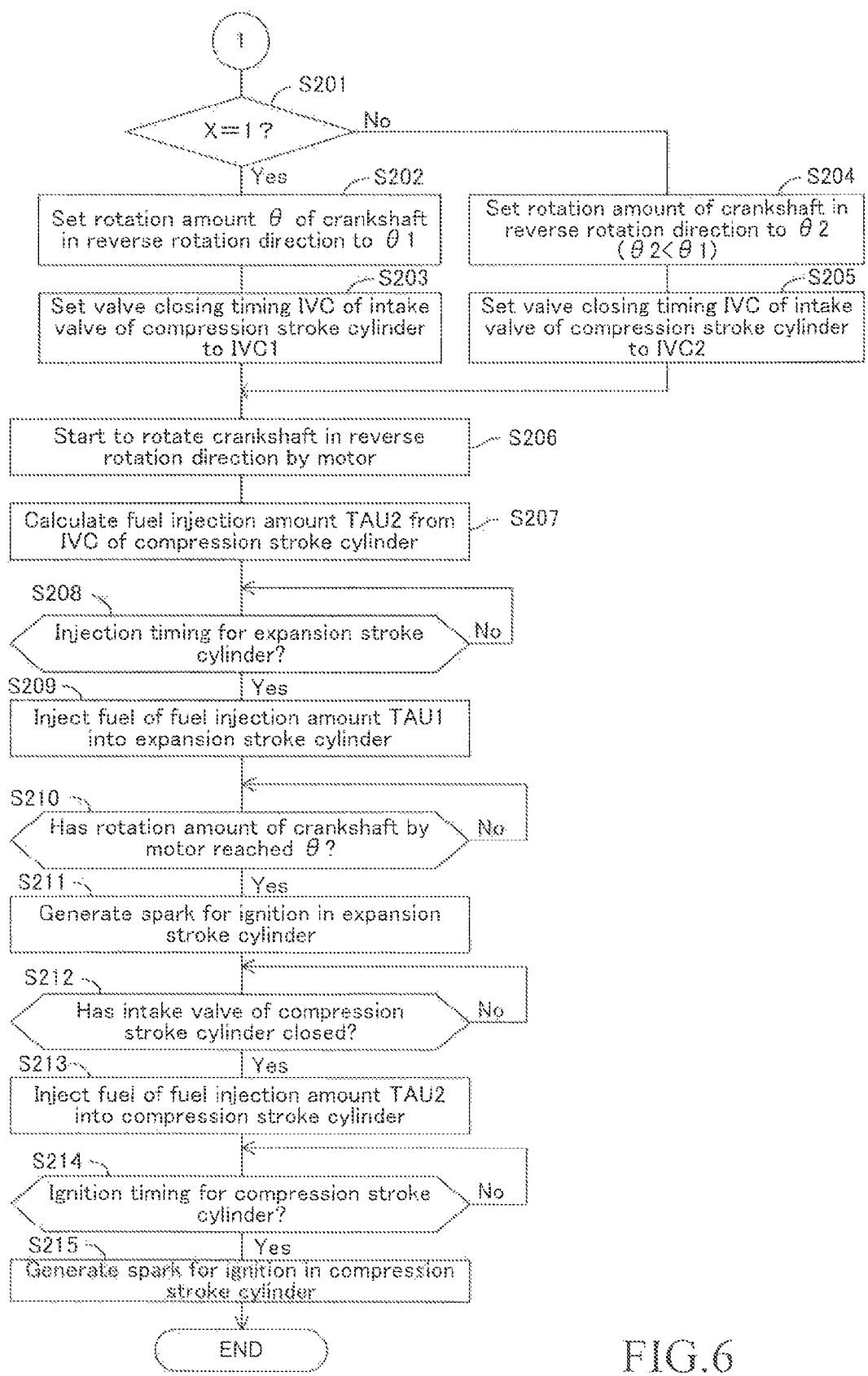
FIG. 6 is a flowchart showing a routine executed by the ECU shown in FIG. 1.
Figure 7:
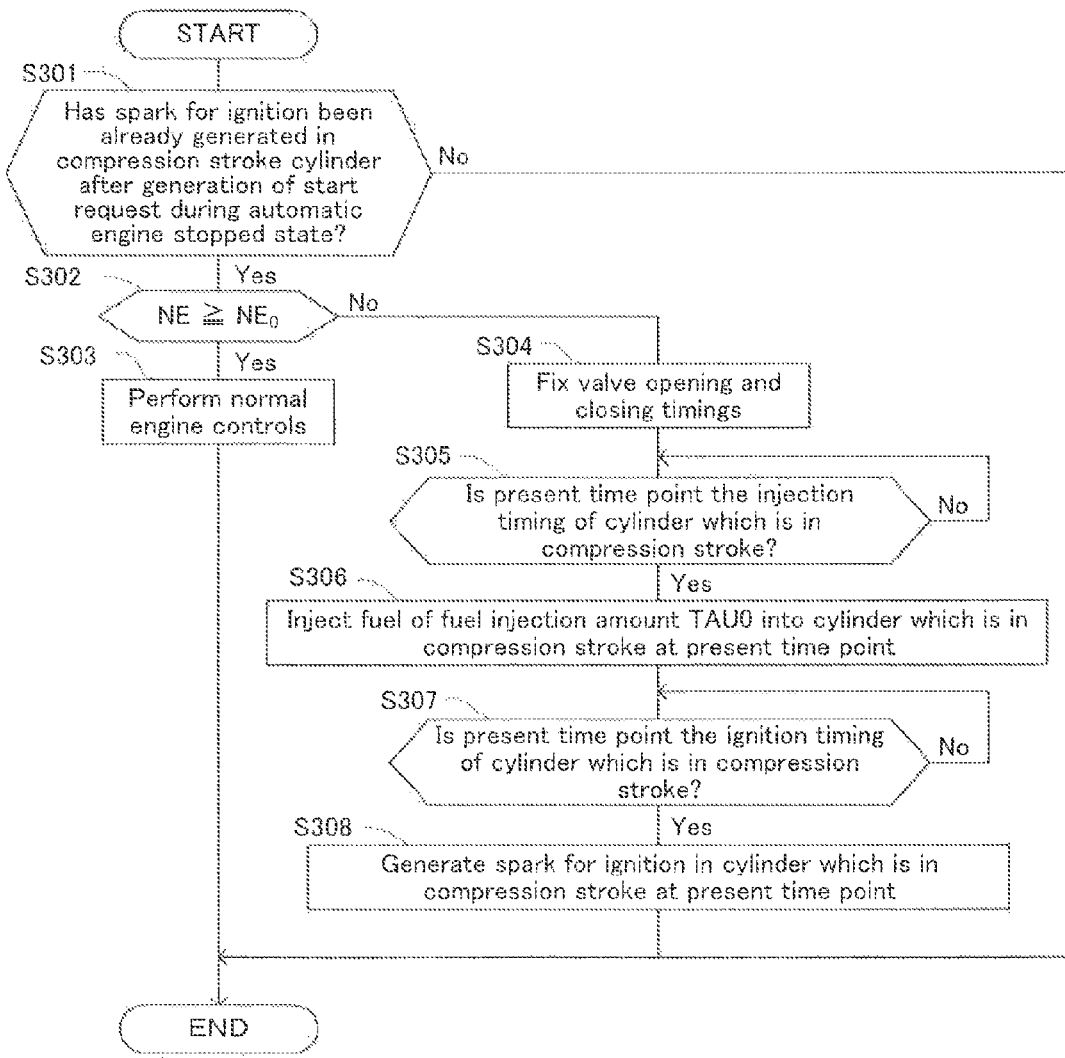
FIG. 7 is a flowchart showing a routine executed by the ECU shown in FIG. 1.

Further, the CPU repeatedly executes processes of a routine shown in FIG. 7 in parallel with the routines shown in FIGS. 5 and 6 every time a predetermined time elapses. Therefore, at an appropriate time point, the CPU proceeds to S301 of FIG. 7 to determine whether or not the spark for ignition has been already generated from the ignition device 35 in the compression stroke cylinder after the start request was generated while the engine 10 had been in the stopped state according to the automatic stop control. When the spark for ignition has not been generated yet from the ignition device 35 in the compression stroke cylinder after the start request was generated while the engine 10 had been in the stopped state according to the automatic stop control, the CPU makes a "No" determination at S301 to tentatively terminate the present routine.

In contrast, when the spark for ignition has already been generated from the ignition device 35 in the compression stroke cylinder after the start request was generated while the engine 10 had been in the stopped state according to the automatic stop control, the CPU makes a "Yes" determination at S301 to proceed to S302, at which the CPU determines whether or not the rotational speed NE of the engine 10 is equal to or higher than the start completion rotational speed NE0 which is roughly equal to the rotational speed when the engine is in the idling state. When the rotational speed NE of the engine 10 is equal to or higher than the start completion rotational speed NE0, it can be determined that the start (automatic start) of the engine 10 has already completed. Thus, in this case, the CPU makes a "Yes" determination at S302 to proceed to S303, at which the CPU performs the fuel injection control and the ignition timing control (namely, normal engine controls after the completion of the start of the engine 10) based on the engine rotational speed and the engine load, and then, the CPU tentatively terminates the present routine.

On the other hand, when the rotational speed NE of the engine 10 is neither equal to nor higher than the start completion rotational speed NE0, the start of the engine 10 has not yet completed. Thus, in this case, the CPU makes a "No" determination at S302 to proceed to S304, at which the CPU fixes the valve opening timing and the valve closing timing of the intake valve 32 of each of the cylinders to the respective predetermined timings. Thereafter, the CPU proceeds to S305 to determine whether or not the present time point is the injection timing of the cylinder which is in the compression stroke. When the present time point is not the injection timing of the cylinder which is in the compression stroke, the CPU makes a "No" determination at S305 to repeat the determination at S305 until the present time point arrives at the injection timing of the cylinder which is in the compression stroke. When the present time point arrives at the injection timing of the cylinder which is in the compression stroke, the CPU makes a "Yes" determination at S305 to proceed to S306 to inject the fuel of the fuel injection amount TAU0 into the cylinder which is in the compression stroke at the present time point. It should be noted that the CPU determines the fuel injection amount TAU0 based on the valve closing timing of the intake valve 32 and the engine rotational speed NE as well as the target air-fuel ratio (in the present embodiment, stoichiometric air-fuel ratio). Specifically, the CPU applies the actual "valve closing timing of the intake valve 32 and the engine rotational speed NE" to a look-up table which defines a relationship between the fuel injection amount TAU0 and "the valve closing timing of the intake valve 32 and the engine rotational speed NE" to determine the fuel injection amount TAU0.

Subsequently, the CPU proceeds to S307 to determine whether or not the present time point is the ignition timing of the cylinder which is in the compression stroke. This ignition timing is determined based on the engine rotational speed and the fuel injection amount TAU0 in such a manner that the maximum value of the engine generating torque becomes the largest value. When the present time point is not the ignition timing of the cylinder which is in the compression stroke, the CPU makes a "No" determination at S307 to repeatedly execute the determination at S307 until the present time point arrives at the ignition timing of the cylinder which is in the compression stroke. Thereafter, when the present time point reaches the ignition timing of the cylinder which is in the compression stroke, the CPU makes a "Yes" determination at S307 to proceed to S308, at which the CPU generates the spark for ignition from the ignition device 35 of the cylinder which is in the compression stroke, and tentatively terminates the present routine.

There has been described the control which the ECU 84 performs when and after the start condition becomes satisfied while the engine 10 is in the automatic stopped state.

Figure 8:
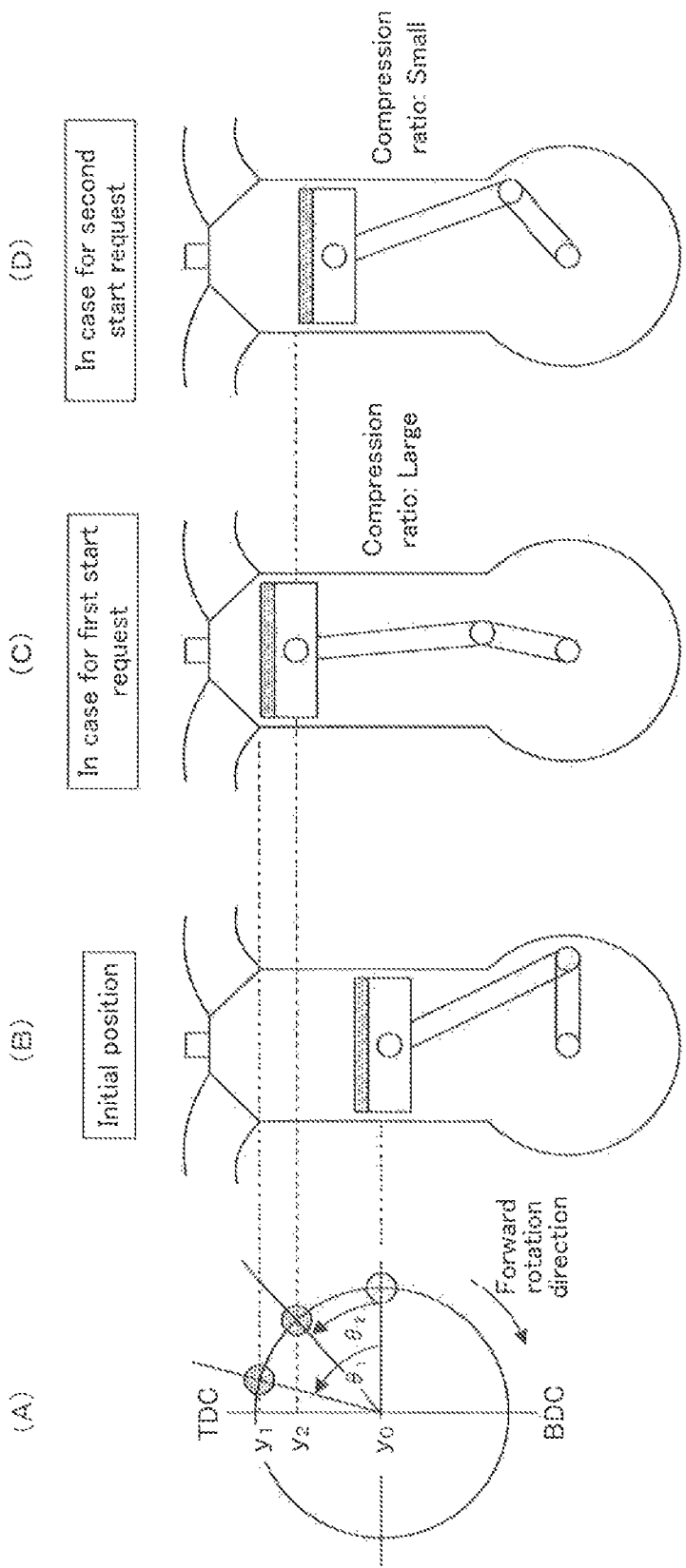
FIG. 8 is a figure to describe operations of the internal combustion engine according to the start control executed by the ECU shown in FIG. 1.

The operations of the engine 10 immediately after the start condition becomes satisfied according to the above control will next be further described referring to FIG. 8. (A) of FIG. 8 shows the crank angle of the expansion stroke cylinder. (B) of FIG. 8 shows an initial position of the piston 22 of the expansion stroke cylinder when the engine 10 is in the automatic stopped state and before the crankshaft 24 has not been reversely rotated by the motor 26. As shown in (A) and (B) of FIG. 8, in this case, the crank angle of the expansion stroke cylinder is about 90° after the compression top dead center TDC of the expansion stroke cylinder. The reason for this will next be described.

When the engine 10 is being operated (except before the completion of the start), the intake valve opening and closing timings of any one of the cylinders are set to be equal to the intake valve opening and closing timings of the other cylinder, and the exhaust valve opening and closing timings of any one of the cylinders are set to be equal to the exhaust valve opening and closing timings of the other cylinder. Therefore, as long as the throttle valve opening degree is kept constant, an air is introduced into each of the cylinders by an amount equal to each other. Further, the intake valves 32 and the exhaust valves 34 of the cylinders in the compression stroke and in the expansion stroke are in the closed state when the crank angle of each of those cylinders are in a range from 90° before the compression top dead center TDC of the respective cylinder and 90° after the compression top dead center TDC of the respective cylinder.

Accordingly, at time point immediately before the engine 10 is completely stopped by the automatic stop control, a cylinder, among the cylinder which is in the compression stroke and the cylinder which is in the expansion stroke, whose piston position is closer to respective compression top dead center receives a force which causes that cylinder to move away from that top dead center by the compression force of the air remaining in that cylinder. As a result, owing to a balance between the "compression force of the air remaining in the cylinder which is in the compression stroke" and the "compression force of the air remaining in the cylinder which is in the expansion stroke", the crank angle of the cylinder which is in the expansion stroke is about 90° after the compression top dead center of the cylinder which is in the expansion stroke, and the crank angle of the cylinder which is in the compression stroke is about 90° before the compression top dead center of the cylinder which is in the compression stroke.

Meanwhile, as described above, when the start condition becomes satisfied based on the generation of the first start request, the engine 10 is reversely rotated by the rotation amount $\theta 1$ by the motor 26. As shown in (A) and (C) of FIG. 8, the rotation amount $\theta 1$ is set in such a manner that the crank angle of the expansion stroke cylinder becomes equal to a first predetermined angle (90°−$\theta 1$>0) after the compression top dead center of the expansion stroke cylinder.

Further, as described above, when the start condition becomes satisfied based on the generation of the second start request, the engine 10 is reversely rotated by the rotation amount $\theta 2$ by the motor 26. As shown in (A) and (D) of FIG. 8, the rotation amount $\theta 2$ is set in such a manner that the crank angle of the expansion stroke cylinder becomes equal to a second predetermined angle (90°−$\theta 2$>0) after the compression top dead center of the expansion stroke cylinder. The rotation amount $\theta 1$ and the rotation amount $\theta 2$ are determined in advance in such a manner that the second predetermined angle (90+−$\theta 2$) is greater than the first predetermined angle (90°−$\theta 1$). That is, each of the rotation amount θ1 and the rotation amount θ2 is smaller than 90°, and the rotation amount θ1 is larger than the rotation amount θ2.

Accordingly, a substantial compression ratio of the expansion stroke cylinder when the engine 10 is reversely rotated by the rotation amount θ1 is greater than a substantial compression ratio of the expansion stroke cylinder when the engine 10 is reversely rotated by the rotation amount θ2. In addition, as described above, in the case where the start condition becomes satisfied owing to the generation of the first start request, the air-fuel mixture in the expansion stroke cylinder is ignited when the engine 10 is reversely rotated by the rotation amount θ1, whereas, in the case where the start condition becomes satisfied owing to the generation of the second start request, the air-fuel mixture in the expansion stroke cylinder is ignited when the engine 10 is reversely rotated by the rotation amount θ2.

Consequently, a maximum value of the engine generating torque generated during the first combustion when the start condition becomes satisfied owing to the generation of the first start request is greater than a maximum value of the engine generating torque generated during the first combustion when the start condition becomes satisfied owing to the generation of the second start request. Therefore, an increasing rate of the rotational speed of the engine 10 is relatively large when the start condition becomes satisfied owing to the generation of the first start request, so that the start response time can be shortened.

In contrast, the maximum value of the engine generating torque generated during the first combustion when the start condition becomes satisfied owing to the generation of the second start request is smaller than the maximum value of the engine generating torque generated during the first combustion when the start condition becomes satisfied owing to the generation of the first start request. Therefore, an increasing rate of the rotational speed of the engine 10 is relatively small when the start condition becomes satisfied owing to the generation of the second start request, so that the vibration of the engine 10 can be suppressed.

Figure 9:
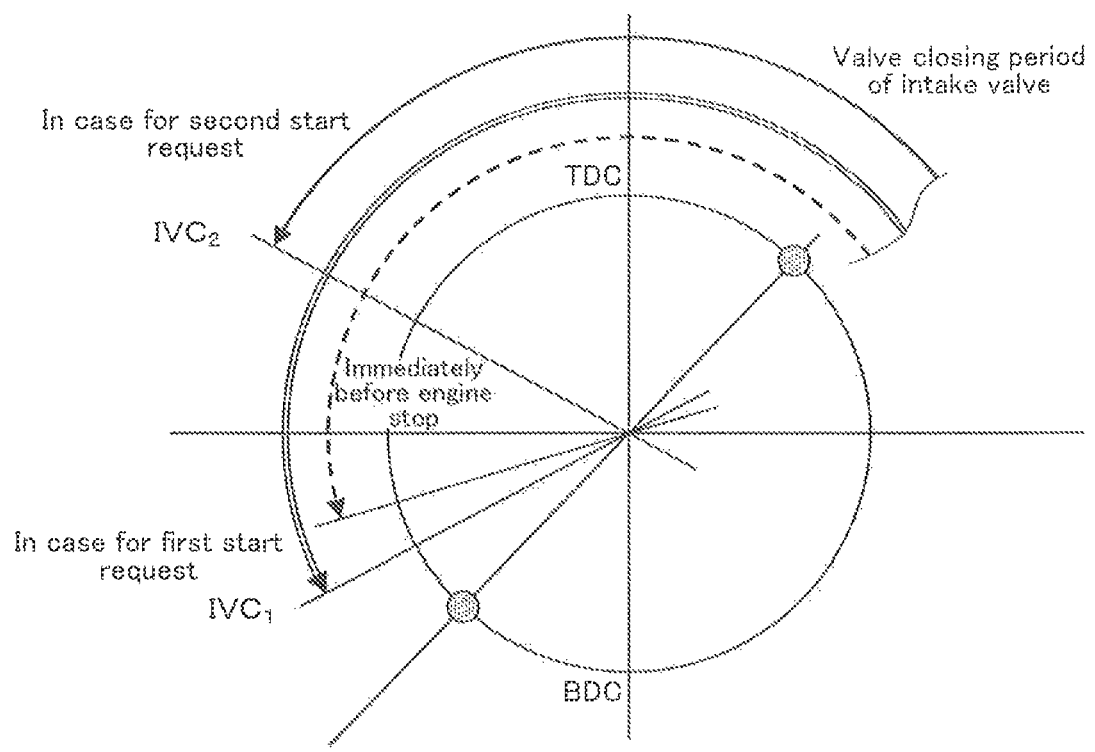
FIG. 9 is a figure to show an opening and closing states of an intake valve of a compression stroke cylinder in the start control executed by the ECU shown in FIG. 1.

Next, the operation of the engine 10 with respect to the second combustion after the start condition becomes satisfied is described with referring to FIG. 9. In FIG. 9, each line indicates a period described below.

The broken line indicates a former part of a valve closing period of the intake valve 32 of the compression stroke cylinder immediately before the engine 10 is stopped according to the automatic stop control.

The double line indicates a former part of a valve closing period of the intake valve 32 of the compression stroke cylinder when the start condition becomes satisfied owing to the generation of the first start request. In this case, as described before, the valve closing timing of the intake valve 32 of the compression stroke cylinder is set at the first valve closing crank angle IVC1.

The solid line indicates a former part of a valve closing period of the intake valve 32 of the compression stroke cylinder when the start condition becomes satisfied owing to the generation of the second start request. In this case, as described before, the valve closing timing of the intake valve 32 of the compression stroke cylinder is set at the second valve closing crank angle IVC2.

In the case where the start condition becomes satisfied owing to the generation of the first start request (the start request flag X=1), the valve closing timing of the intake valve 32 of the compression stroke cylinder is set at the first valve closing crank angle IVC1 which is at the retarded side with respect to the intake bottom dead center BDC. In the case where the start condition becomes satisfied owing to the generation of the second request (the start request flag X=0), the valve closing timing of the intake valve 32 of the compression stroke cylinder is set at the second valve closing crank angle IVC2 which is at the retarded side with respect to the intake bottom dead center BDC. The first valve closing crank angle IVC1 is a crank angle at the advanced side (namely, at the intake bottom dead center BDC side) with respect to the second valve closing crank angle IVC2.

Therefore, the intake valve 32 of the compression stroke cylinder is closed at a relatively earlier timing (time point) when the crankshaft 24 rotates in the forward rotation direction owing to the first combustion in the expansion stroke cylinder in the case where the start condition becomes satisfied owing to the generation of the first start request, as compared with the case where the start condition becomes satisfied owing to the generation of the second start request. As a result, an amount of air which is compressed in the compression stroke cylinder becomes larger, and thus, the amount of the fuel injected from the fuel injector 39 becomes larger. Accordingly, the maximum value of the engine generating torque generated during the combustion in the compression stroke cylinder becomes high. Consequently, the rising (increasing) rate of the rotational speed of the engine 10 becomes high, so that the start response time can be shortened.

In contrast, the intake valve 32 of the compression stroke cylinder is closed at a relatively later timing (time point) when the crankshaft 24 rotates in the forward rotation direction owing to the first combustion in the expansion stroke cylinder in the case where the start condition becomes satisfied owing to the generation of the second start request, as compared with the case where the start condition becomes satisfied owing to the generation of the first start request. As a result, an amount of air which is compressed in the compression stroke cylinder becomes smaller, and thus, the amount of the fuel injected from the fuel injector 39 becomes smaller. Accordingly, the maximum value of the engine generating torque generated during the combustion in the compression stroke cylinder becomes low. Therefore, even if the engine 10 resonates (vibrates sympathetically) because the frequency of the combustion interval is within the range of the character frequency, the vibration of the engine 10 can be suppressed.

<First Modified Example of the First Embodiment>

A control apparatus for an internal combustion engine according to a first modified example of the first embodiment of the present invention will next be described. The first modified example of the first embodiment is different from the first embodiment only in that its ECU 84 of the first modified example executes a routine shown in FIG. 10 in place of the routine shown in FIG. 6. Hereinafter, this difference will be mainly described.

Figure 10:
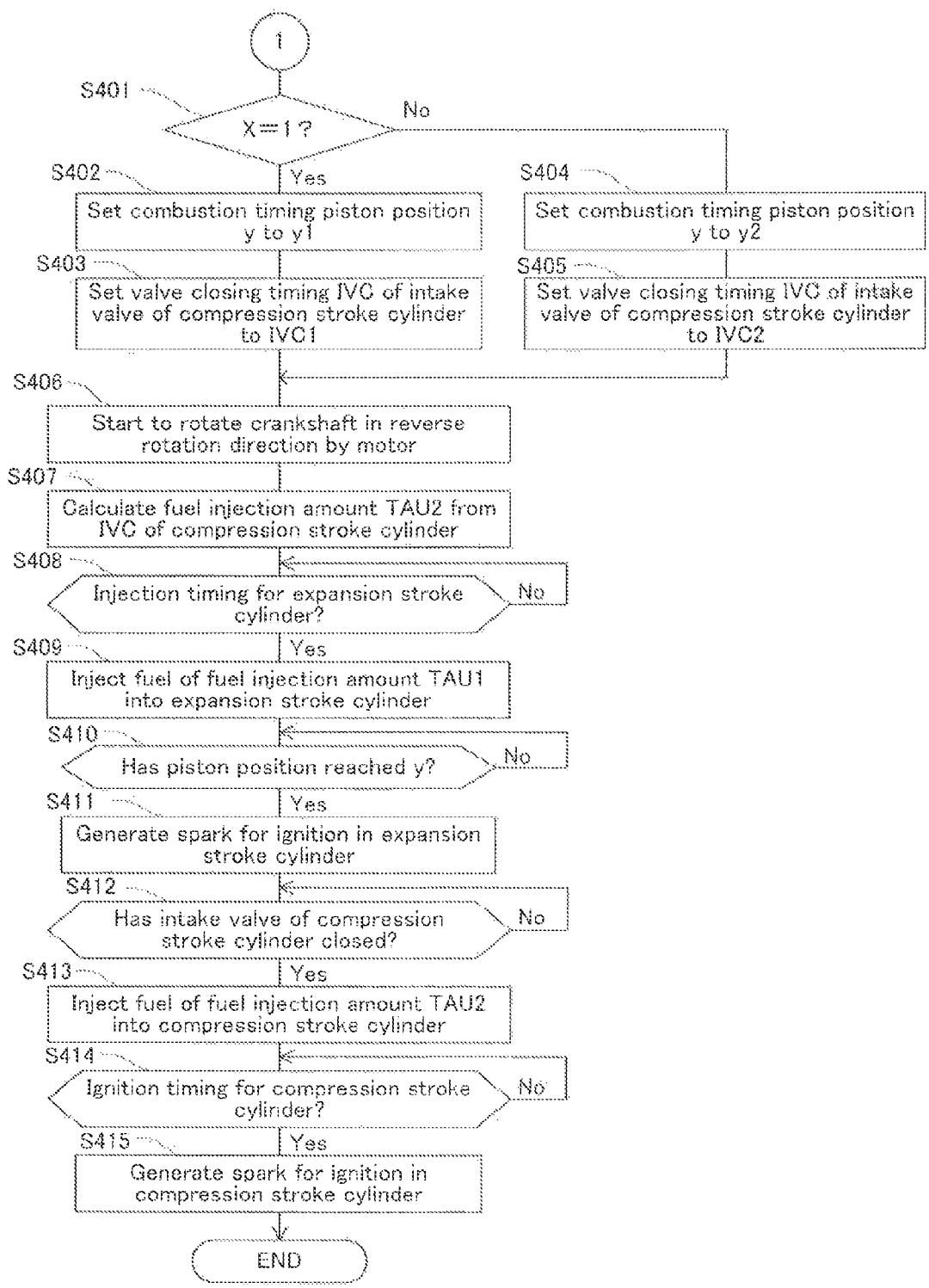
FIG. 10 is a flowchart showing a routine executed by an ECU according to a first modification of the first embodiment of the present invention.

The routine shown in FIG. 10 is executed immediately after the execution of S106 or S107 of FIG. 5, similarly to the routine shown in FIG. 6. Further, steps from S401 to S415 in the routine shown in FIG. 10 are steps for executing the same processes as S201 to S215 in the routine shown in FIG. 6, except for S402, S404, and S410. Therefore, hereinafter, the processes of S402, S404 and S410 will be further described.

When the start request flag X is set at "1", the CPU makes a "Yes" determination at S401 to proceed to S402. At S402, the CPU sets a "position y (hereinafter, also referred to as a "combustion timing piston position") of the piston 22 of the expansion stroke cylinder at which the ignition device 35 should generate the spark for ignition while the motor 26 reversely rotates the crankshaft 24" to a first piston position y1. The first piston position y1 will be described later with referring to FIG. 8.

When the start request flag X is set at "0", the CPU makes a "No" determination at S401 to proceed to S404. At S404, the CPU sets the combustion timing piston position (while the motor 26 reversely rotates the crankshaft 24) to a second piston position y2. The second piston position y2 will also be described later with referring to FIG. 8. The second piston position y2 is at the expansion bottom dead center BDC side as compared to the first piston position y1.

At S410, the CPU determines whether or not the position of the piston 22 of the expansion stroke cylinder reaches the combustion timing piston position y which was set at S402 or S404. When the position of the piston 22 of the expansion stroke cylinder has not reached the combustion timing piston position y, the CPU makes a "No" determination to repeat the determination at S410 until the position of the piston 22 of the expansion stroke cylinder reaches the combustion timing piston position y. When the position of the piston 22 of the expansion stroke cylinder has reached the combustion timing piston position y, the CPU makes a "Yes" determination to proceed to S411. It should be noted that, the combustion timing piston position y has been set at the first piston position y1 at S402 when the start request flag X is "1", and the combustion timing piston position y has been set at the second piston position y2 at S404 when the start request flag X is "0." The CPU determines based on the crank angle whether or not the position of the piston 22 of the expansion stroke cylinder reaches the combustion timing piston position y set at S402 or S404. Further, the CPU may operates as follows.

The CPU stores a crank angle into the RAM, the crank angle corresponding to a piston position (namely, an engine stop timing piston position) y0 at a time point when the engine 10 is completely stopped according to the automatic stop control.

The CPU calculates a crank angle as a "rotation amount in the reverse rotation direction of the engine 10 by the motor 26" by subtracting a crank angle corresponding to the engine stop timing piston position y0 from a crank angle corresponding to the combustion timing piston position y The CPU drives the motor 26 so as to reversely rotate the engine 10 by the calculated rotation amount.

Now, referring back to FIG. 8 again, the piston position y1 is closer to the compression top dead center TDC than the piston position y2. Thus, when the combustion timing piston position is set at the piston position y1, the substantial compression ratio of the expansion stroke cylinder for the first combustion becomes large, whereby the maximum value of the engine generating torque becomes large. Therefore, since the increasing rate of the rotational speed of the engine 10 is large, the start response time can be shortened. In contrast, when the combustion timing piston position is set at the piston position y2, the combustion timing piston position is at the side of the expansion bottom dead center BDC, as compared when the combustion timing piston position is set at the piston position y1. Thus, since the substantial compression ratio of the expansion stroke cylinder for the first combustion becomes small, the maximum value of the engine generating torque becomes small. Therefore, the vibration of the engine 10 can be suppressed. Accordingly, the modified example can also achieve a balance between shortening the start response time and suppressing the vibration when the engine is started. In addition, the present modified example can certainly set the piston position at the ignition timing for the first combustion to a desired position, even when the engine stopped timing piston position y0 varies (fluctuates). Therefore, the start response time can certainly be shortened when the start condition becomes satisfied owing to the generation of the first start request, and the vibration of the engine 10 can certainly be suppressed when the start condition becomes satisfied owing to the generation of the second start request.

<Second Modified Example of the First Embodiment>

A control apparatus for an internal combustion engine according to a second modified example of the first embodiment of the present invention will next be described. The second modified example of the first embodiment is different from the first embodiment only in that its ECU 84 of the second modified example executes a routine shown in FIG. 11 in place of the routines shown in FIGS. 5 and 6. Hereinafter, this difference will be mainly described.

Figure 11:
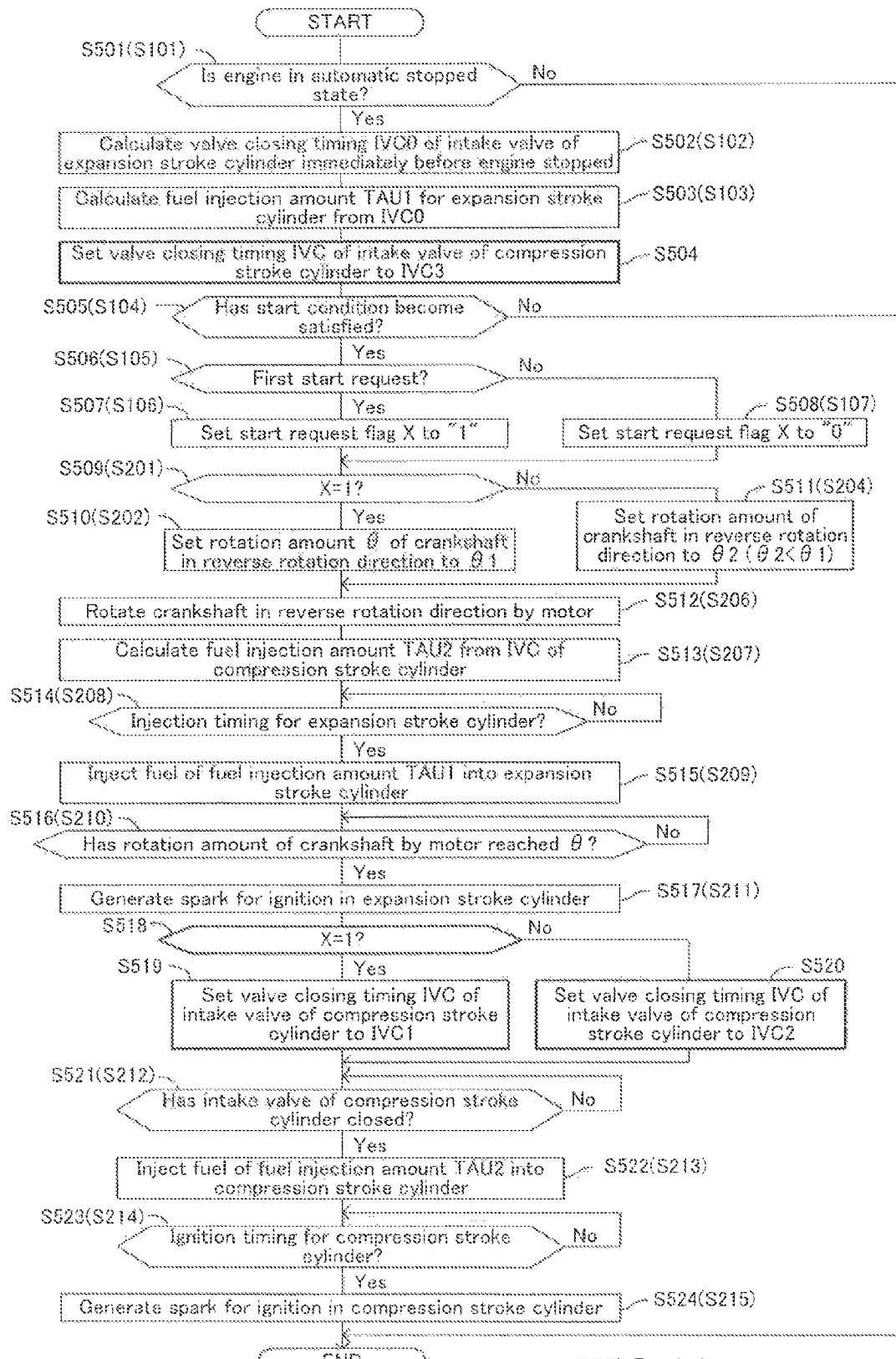
FIG. 11 is a flowchart showing a routine executed by an ECU according to a second modification of the first embodiment of the present invention.

Steps from S501 to S524 in the routine shown in FIG. 11 are steps for executing the same processes as S101 to S107 in the routine shown in FIG. 5 and as S201 to S215 in the routine shown in FIG. 6, except for S504, S518, and S520. It should be noted that the reference numbers shown in FIGS. 5 and 6 are added with parentheses to the steps, among the steps shown in FIG. 11, which cause the CPU to execute the same processes as the steps shown in FIGS. 5 and 6. Namely, for example, S501 (S101) shown in FIG. 11 indicates that S501 is a step for executing the same process as the process of S101. Hereinafter, the processes of "S504, and S518 to S528" that are peculiar to the routine shown in FIG. 11 will be mainly described.

At step 504, the CPU sets the valve closing timing IVC of the intake valve 32 of the compression stroke cylinder to a third valve closing timing IVC3. The third valve closing timing IVC3 is a valve closing timing, which is set at the retarded side by a predetermined crank angle with respect to 90° before the compression top dead center TDC of the compression stroke cylinder, and which is before the compression top dead center TDC of the compression stroke cylinder. Thereby, when the engine 10 is in the automatic stopped state, the intake valve 32 of the compression stroke cylinder is in the opened sate. It should be noted that the third valve closing timing IVC3 may be the same timing as the second valve closing timing IVC2 in the first embodiment.

Further, after the CPU generates the spark for ignition from the ignition device 35 of the expansion stroke cylinder at S517, the CPU proceeds to step S518 to determine whether or not the start request flag X is set at "1." When the start request flag X is set at "1", the CPU makes a "Yes" determination at S518 to proceed to S519, at which the CPU sets the valve closing timing IVC of the intake valve 32 of the compression stroke cylinder to the first closing valve timing IVC1. In contrast, when the start request flag X is set at "0", the CPU makes a "No" determination at S518 to proceed to S520, at which the CPU sets the valve closing timing IVC of the intake valve 32 of the compression stroke cylinder to the second closing valve timing IVC2.

As described above, the second modified example sets the valve closing timing IVC of the intake valve 32 of the compression stroke cylinder to the crank angle at the retarded side with respect to 90° before the compression top dead center TDC, before it has the motor 26 reversely rotate the crankshaft 24. Meanwhile, as described above, during the engine 10 is in the automatic stopped state, the crank angle of the compression stroke cylinder is generally about 90° before the compression top dead center TDC. Therefore, at the time point at which the second modified example has the motor 26 start to rotate the crankshaft 24 in the reverse rotation direction in order to generate the first combustion in the expansion stroke cylinder, the intake valve 32 of the compression stroke cylinder is in the opened valve state. A torque required to reversely rotate the crankshaft 24 becomes smaller when the intake valve 32 is in the opened state than when the intake valve 32 is in the closed state, and therefore, an electric power required to drive the motor 26 becomes smaller. Accordingly, the second modified example not only can achieve a balance between shortening the start response time and suppressing the vibration when the engine is started, but also can decrease the electric power amount that are consumed for starting the engine 10.

It should be noted that, although the second modified example sets/determines the ignition timing of the expansion stroke cylinder using the rotation amount θ of the crankshaft 24 in the reverse rotation direction by the motor 26, it may set/determine the ignition timing of the expansion stroke cylinder using the combustion timing piston position y, as the first modified example of the first embodiment.

Second Embodiment

A control apparatus for an internal combustion engine of a second embodiment according to the present invention (hereinafter, also referred to as a "second apparatus") will next be described. The second apparatus is different from the first apparatus only in that the second apparatus does not execute S203 shown in FIG. 6 and does not execute S205 shown in FIG. 6. Namely, the second apparatus sets the valve closing timing of the intake valve of the compression stroke cylinder to a constant timing regardless of whether or not the start flag is "1." As a result, the maximum value of the engine generating torque by the combustion in the compression stroke cylinder (namely, second combustion) remains unchanged regardless of which request, the first start request or the second start request, satisfies the start condition.

On the other hand, similarly to the first apparatus, the second apparatus changes the substantial compression ratio at the ignition timing of the expansion stroke cylinder based on whether or not the start condition becomes satisfied owing to the first start request so as to change only the maximum value of the engine generating torque generated by the first combustion. That is, the position of the piston 22 at the ignition timing for the first combustion (namely, the ignition timing to cause the combustion in the expansion stroke cylinder) is made closer to the compression top dead center when the start condition becomes satisfied owing to the first start request than the position of the piston 22 at the ignition timing for the first combustion when the start condition becomes satisfied owing to the second start request. Consequently, the maximum value of the engine generating torque generated by the first combustion becomes larger so that the start response time can be shortened. In contrast, the position of the piston 22 at the ignition timing for the first combustion (namely, the ignition timing to cause the combustion in the expansion stroke cylinder) is made more apart from the compression top dead center when the start condition becomes satisfied owing to the second start request than the position of the piston 22 at the ignition timing for the first combustion when the start condition becomes satisfied owing to the first start request. Consequently, the maximum value of the engine generating torque generated by the first combustion becomes smaller so that the vibration of the engine 10 can be suppressed.

Third Embodiment

A control apparatus for an internal combustion engine of a third embodiment according to the present invention (hereinafter, also referred to as a "third apparatus") will next be described. The third apparatus is different from the first apparatus only in that the third apparatus does not execute S202 shown in FIG. 6 and does not execute S204 shown in FIG. 6. Namely, the third apparatus sets the rotation amount θ of the crankshaft 24 in the reverse rotation direction to a constant rotation amount regardless of whether or not the start flag is "1." As a result, the maximum value of the engine generating torque generated by the combustion in the expansion stroke cylinder (namely, first combustion) remains unchanged regardless of which request, the first start request or the second start request, satisfies the start condition.

In contrast, similarly to the first apparatus, the third apparatus changes the amount of air remained in the compression stroke cylinder based on whether or not the start condition becomes satisfied owing to the first start request so as to change only the maximum value of the engine generating torque generated by the second combustion. That is, the closing timing of the intake valve 32 of the compression stroke cylinder which causes the second combustion is set at the more advanced side when the start condition becomes satisfied owing to the first start request as compared to when the start condition becomes satisfied owing to the second start request. Consequently, the maximum value of the engine generating torque generated by the second combustion becomes larger. Thus, the increasing rate of the rotational speed of the engine 10 becomes larger, thereby the start response time can be shortened. On the other hand, the closing timing of the intake valve 32 of the compression stroke cylinder which is set at the more retarded side when the start condition becomes satisfied owing to the second start request as compared to when the start condition becomes satisfied owing to the first start request. As a result, the maximum value of the engine generating torque generated by the second combustion becomes smaller. Accordingly, the vibration of the engine 10 can be suppressed.

As described above, according to each of the embodiments and each of the modified examples, the start response time can be shortened when the start condition becomes satisfied owing to the first start request, and the vibration of the engine 10 can be suppressed when the start condition becomes satisfied owing to the second start request, whereby the possibility that the driver feels uncomfortable about the vibration can be lowered. It should be noted that the present invention should not be limited to the embodiments and so on described above, but various modifications may be adopted within the scope of the present invention.

For example, the first apparatus and the third apparatus may adopt an electromagnetic intake valve driving device which can freely vary the valve timings to open and close the intake valves 32. The electromagnetic intake valve driving device can open and close the intake valve 32 at a desired timing in response to instruction signals from the ECU 84. Therefore, in this case, the electromagnetic intake valve driving device can be utilized as the variable valve timing adjusting device for varying the valve closing timing of the intake valve 32 of the compression stroke cylinder.

Figure 12:
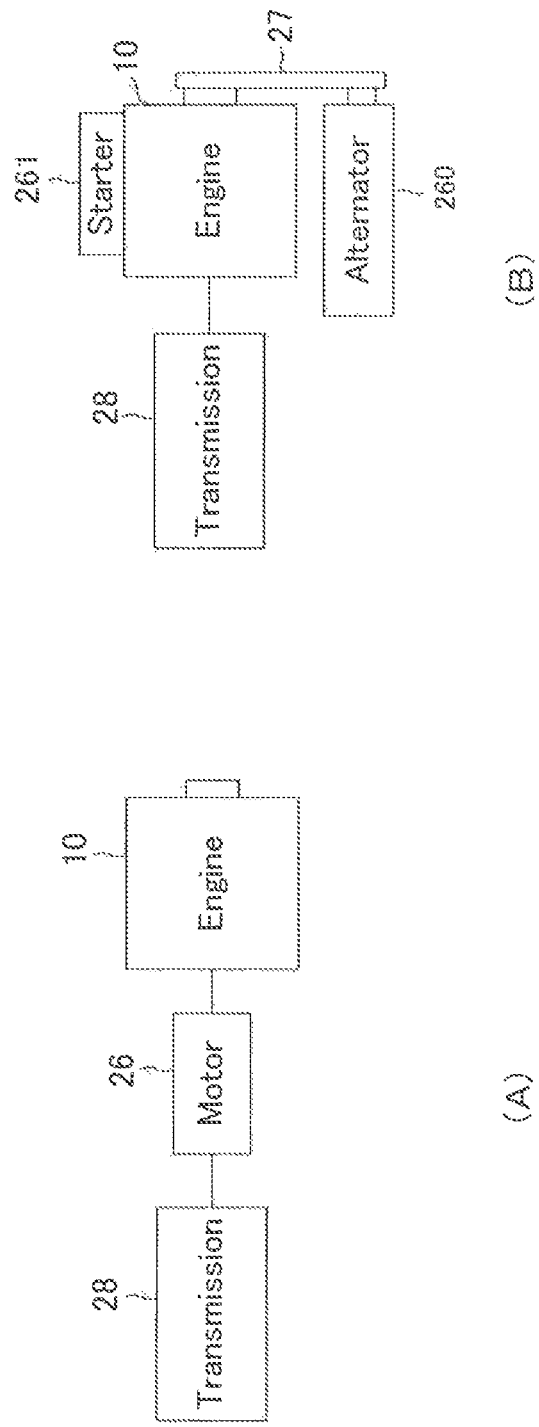
FIG. 12 includes schematic configuration diagrams of a driving system of a vehicle on which the control apparatus for an internal combustion engine according to each of the embodiments and modifications of the present invention can be mounted.

Further, each of the embodiments and each of the modified examples can adopt a structure other than the structure shown in FIGS. 1 and 2, as long as it can reversely rotate the crankshaft 24. For example, as shown in (A) of FIG. 12, the motor 26 may be arranged between the engine 10 and the transmission 28. Further, as shown in (B) of FIG. 12, an alternator 260 in place of the motor 26 and a starter 261 which can rotate the crankshaft 24 in the reverse rotation direction can be provided.

Further, each of the embodiments and each of the modified examples substantially vary the compression ratio of the expansion stroke cylinder to thereby vary the amount of air remained in the compression stroke cylinder so as to change the maximum value of the engine generating torque. However, each of them may vary an air-fuel ratio (hereinafter, referred to as a start timing combustion air-fuel ratio) of the mixture to be burnt in each of the expansion stroke cylinder and the compression stroke cylinder to thereby change the maximum value of the engine generating torque. That is, for example, the CPU may control the fuel injection amount in such a manner that the start timing combustion air-fuel ratio becomes equal to stoichiometric air-fuel ratio when the start condition becomes satisfied owing to the first start request, and control the fuel injection amount in such a manner that the start timing combustion air-fuel ratio becomes equal to an "air-fuel ratio (lean air-fuel ratio) larger than the stoichiometric air-fuel ratio" when the start condition becomes satisfied owing to the second start request. According to this configuration, when the start condition becomes satisfied owing to the first start request, since the start timing combustion air-fuel ratio for the first combustion and/or the second combustion is the stoichiometric air-fuel ratio, the maximum value of the engine generating torque can be made larger. Therefore, the start response time can be shortened. On the other hand, when the start condition becomes satisfied owing to the second start request, since the start timing combustion air-fuel ratio for the first combustion and/or the second combustion is the lean air-fuel ratio, the maximum value of the engine generating torque can be made smaller. Therefore, the vibration of the engine 10 can be suppressed. Further, the above change in start timing combustion air-fuel ratio may be made in addition to the start timing control (i.e., the substantial change in the compression ratio of the expansion stroke cylinder and/or the change in the amount of air remained in the compression stroke cylinder) in the each of the embodiments.

What is claimed is:

1. A control apparatus for an internal combustion engine, applied to a multi-cylinder internal combustion engine comprising a motor which rotates a crankshaft, wherein each of cylinders of said engine having:
   a piston configured to be able to reciprocate;
   a fuel injector which injects a fuel directly into a combustion chamber; and
   an ignition device which generates a spark for ignition in said combustion chamber,
   comprising:
   condition satisfaction determination means for determining whether or not a predetermined start condition becomes satisfied after said internal combustion engine is in a stopped state according to an automatic stop control;
   start control means for reversely rotating said crankshaft using said motor to compress an air in an expansion stroke cylinder being a cylinder which is in an expansion stroke while said engine is in the stopped state according to said automatic stop control; for injecting said fuel from said fuel injector to form an air-fuel mixture in said expansion stroke cylinder, and thereafter; for generating said spark for ignition by said ignition device to ignite said air-fuel mixture in said expansion stroke cylinder to cause a first time combustion after said start condition becomes satisfied, to thereby cause a rotation in a forward rotation direction of said internal combustion engine; for injecting said fuel from said fuel injector to form an air-fuel mixture in a compression stroke cylinder being a cylinder which is in a compression stroke while said engine is in the stopped state according to said automatic stop control with compressing an air in said compression stroke cylinder by said rotation in said forward rotation direction; and for generating said spark for ignition at a predetermined ignition timing by said ignition device to ignite said air-fuel mixture in said compression stroke cylinder to cause a second time combustion after said start condition becomes satisfied, to thereby start said internal combustion engine, when it is determined that said start condition becomes satisfied,
   wherein,
   said start control means is configured to:
   determine which request, a specific start request or a start request other than said specific start request, satisfies the said start condition, said specific start request being a start request caused by an driving operation of a driver of a vehicle on which said internal combustion engine is mounted;
   make, one of only a maximum value of an engine generating torque generated by said first time combustion, only a maximum value of an engine generating torque generated by said second time combustion, and only maximum values of both of an engine generating torque generated by said first time combustion and an engine generating torque generated by said second time combustion, larger when it is determined that said start condition becomes satisfied by said specific start request as compared to when it is determined that said start condition becomes satisfied by said start request other than said specific start request.

2. The control apparatus for an internal combustion engine according to claim 1, wherein
   said start control means is configured to make at least said maximum value of said engine generating torque generated by said first time combustion larger when it is determined that said start condition becomes satisfied by said specific start request as compared to when it is determined that said start condition becomes satisfied by said start request other than said specific start request, and wherein
   said start control means is configured to operate said motor and said ignition device in such a manner that a piston position of said expansion stroke cylinder at a generation timing of said spark for ignition which causes said first time combustion is closer to a compression top dead center when it is determined that said start condition becomes satisfied by said specific start request as compared to when it is determined that said start condition becomes satisfied by said start request other than said specific start request.

3. The control apparatus for an internal combustion engine according to claim 1, wherein,
   said internal combustion engine further comprises a variable valve timing adjusting device which is able to vary a valve opening timing and a valve closing timing of an intake valve,
   said start control means is configured to make at least a maximum value of said engine generating torque generated by said second time combustion larger when it is determined that said start condition becomes satisfied by said specific start request as compared to when it is determined that said start condition becomes satisfied by said start request other than said specific start request, and wherein, said start control means is configured to drive said variable valve timing adjusting device in such a manner that said valve closing timing of said intake valve of said compression stroke cylinder becomes more advanced timing and closer to an intake bottom dead center when it is determined that said start condition becomes satisfied by said specific start request as compared to when it is determined that said start condition becomes satisfied by said start request other than said specific start request.

4. The control apparatus for an internal combustion engine according to claim 3, wherein, said start control means is configured to drive said variable valve timing adjusting device to retard a valve closing timing of said intake valve of said compression stroke cylinder in such a manner that said intake valve is opened during said internal combustion engine is in the stopped state according to said automatic stop control.

5. The control apparatus for an internal combustion engine according to claim 2, wherein, said internal combustion engine further comprises a variable valve timing adjusting device which is able to vary a valve opening timing and a valve closing timing of an intake valve, said start control means is configured to make at least a maximum value of said engine generating torque generated by said second time combustion larger when it is determined that said start condition becomes satisfied by said specific start request as compared to when it is determined that said start condition becomes satisfied by said start request other than said specific start request, and wherein, said start control means is configured to drive said variable valve timing adjusting device in such a manner that said valve closing timing of said intake valve of said compression stroke cylinder becomes more advanced timing and closer to an intake bottom dead center when it is determined that said start condition becomes satisfied by said specific start request as compared to when it is determined that said start condition becomes satisfied by said start request other than said specific start request.

6. The control apparatus for an internal combustion engine according to claim 5, wherein, said start control means is configured to drive said variable valve timing adjusting device to retard a valve closing timing of said intake valve of said compression stroke cylinder in such a manner that said intake valve is opened during said internal combustion engine is in the stopped state according to said automatic stop control.

* * * * *